(12) United States Patent
James et al.

(10) Patent No.: US 9,286,414 B2
(45) Date of Patent: Mar. 15, 2016

(54) DATA DISCOVERY AND DESCRIPTION SERVICE

(75) Inventors: Alex James, Sammamish, WA (US);
Michael Pizzo, Bellevue, WA (US);
Pablo Castro, Redmond, WA (US);
Michael Justin Flasko, Duvall, WA (US); Lance Olson, Sammamish, WA (US); Jason Clark, Woodinville, WA (US); Siddharth Jayadevan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 13/310,517

(22) Filed: Dec. 2, 2011

(65) Prior Publication Data
US 2013/0144878 A1  Jun. 6, 2013

(51) Int. Cl.
*G06F 17/30* (2006.01)

(52) U.S. Cl.
CPC .............. *G06F 17/30997* (2013.01)

(58) Field of Classification Search
USPC .................................. 707/736; 715/230–233
See application file for complete search history.

(56) References Cited

U.S. PATENT DOCUMENTS

| | | | |
|---|---|---|---|
| 5,734,923 A | 3/1998 | Sagawa et al. | |
| 6,122,647 A | 9/2000 | Horowitz et al. | |
| 6,397,181 B1* | 5/2002 | Li et al. | 704/256.4 |
| 7,254,593 B2 | 8/2007 | Albornoz et al. | |
| 7,479,949 B2 | 1/2009 | Jobs et al. | |
| 7,607,079 B2 | 10/2009 | Reiner | |
| 7,720,953 B2* | 5/2010 | Mateescu et al. | 709/223 |
| 7,788,099 B2 | 8/2010 | Haubold et al. | |
| 8,078,958 B2 | 12/2011 | Cottrille et al. | |
| 8,289,162 B2 | 10/2012 | Mooring et al. | |
| 8,356,036 B2* | 1/2013 | Bechtel et al. | 707/748 |
| 8,495,099 B2* | 7/2013 | Maim | 707/794 |
| 8,504,587 B2* | 8/2013 | Athsani et al. | 707/783 |
| 8,560,297 B2* | 10/2013 | Quirk et al. | 704/2 |
| 8,799,815 B2 | 8/2014 | Hoellwarth | |
| 2002/0124018 A1* | 9/2002 | Fifield et al. | 707/512 |

(Continued)

OTHER PUBLICATIONS

Douglas Turnbull, et al.; A Game-Based Approach for Collecting Semantic Annotations of Music, http://ismir2007.ismir.net/proceedings/ismir2007_p535_turnbull.pdf.

(Continued)

*Primary Examiner* — Hanh Thai
(74) *Attorney, Agent, or Firm* — Nicholas Chen; Kate Drakos; Micky Minhas

(57) ABSTRACT

The subject disclosure relates to one or more computer-implemented processes for collecting, analyzing, and employing annotations of data sources. In particular, an annotation component is configured to receive annotations of data for a data source, wherein the respective annotations comprise different associations of a global terms with the data of the data source, a data store configured to store the annotations, and an interface component configured to render the data based on the annotations in response to a request for the data. In an aspect, storing information, the data also stores descriptions of the data sources and definitions of the global terms, and the interface component determines a subset of the information in the data store based on the annotations. A method is further provided comprising receiving a global term and determining data sources that have the global term associated with the data thereof based on the information in the data store.

21 Claims, 10 Drawing Sheets

(56) References Cited

U.S. PATENT DOCUMENTS

| | | | |
|---|---|---|---|
| 2003/0188299 A1* | 10/2003 | Broughton et al. | 717/141 |
| 2004/0249791 A1* | 12/2004 | Waters et al. | 707/3 |
| 2005/0149552 A1* | 7/2005 | Chan et al. | 707/102 |
| 2005/0197784 A1* | 9/2005 | Kincaid et al. | 702/19 |
| 2005/0209989 A1* | 9/2005 | Albornoz et al. | 707/1 |
| 2005/0234958 A1* | 10/2005 | Sipusic et al. | 707/102 |
| 2006/0121795 A1 | 6/2006 | Hashimura et al. | |
| 2006/0168480 A1* | 7/2006 | Chandler et al. | 714/38 |
| 2006/0212795 A1* | 9/2006 | Cottrille et al. | 715/512 |
| 2006/0218485 A1* | 9/2006 | Blumenthal | 715/512 |
| 2007/0136657 A1* | 6/2007 | Blumenthal et al. | 715/512 |
| 2008/0036743 A1 | 2/2008 | Westerman et al. | |
| 2008/0186255 A1 | 8/2008 | Cohen et al. | |
| 2008/0189312 A1 | 8/2008 | Taranov et al. | |
| 2008/0256062 A1 | 10/2008 | Dettinger et al. | |
| 2009/0018867 A1 | 1/2009 | Reiner | |
| 2009/0083314 A1* | 3/2009 | Maim | 707/103 R |
| 2009/0119573 A1* | 5/2009 | Wang et al. | 715/209 |
| 2009/0119576 A1* | 5/2009 | Pepper et al. | 715/230 |
| 2009/0132941 A1* | 5/2009 | Pilskalns et al. | 715/764 |
| 2009/0164889 A1 | 6/2009 | Piersol et al. | |
| 2009/0307618 A1 | 12/2009 | Lawler et al. | |
| 2010/0005061 A1* | 1/2010 | Basco et al. | 707/3 |
| 2010/0005087 A1* | 1/2010 | Basco et al. | 707/5 |
| 2010/0011282 A1* | 1/2010 | Dollard et al. | 715/233 |
| 2010/0057699 A1 | 3/2010 | Sridhar et al. | |
| 2010/0070845 A1* | 3/2010 | Facemire et al. | 715/230 |
| 2010/0115393 A1* | 5/2010 | Albornoz et al. | 715/230 |
| 2010/0177956 A1* | 7/2010 | Cooper et al. | 382/159 |
| 2010/0223276 A1* | 9/2010 | Al-Shameri et al. | 707/769 |
| 2010/0325620 A1* | 12/2010 | Rohde et al. | 717/154 |
| 2011/0078205 A1 | 3/2011 | Salkeld et al. | |
| 2011/0090407 A1 | 4/2011 | Friedman | |
| 2011/0119640 A1 | 5/2011 | Berkes et al. | |
| 2011/0169726 A1 | 7/2011 | Holmdahl et al. | |
| 2011/0173204 A1 | 7/2011 | Murillo et al. | |
| 2011/0173214 A1* | 7/2011 | Karim | 707/754 |
| 2011/0221974 A1 | 9/2011 | Stern et al. | |
| 2011/0301941 A1* | 12/2011 | De Vocht | 704/9 |
| 2012/0030553 A1* | 2/2012 | Delpha et al. | 715/205 |
| 2012/0060082 A1 | 3/2012 | Edala et al. | |
| 2012/0078906 A1* | 3/2012 | Anand et al. | 707/737 |
| 2012/0166183 A1* | 6/2012 | Suendermann et al. | 704/9 |
| 2012/0246154 A1* | 9/2012 | Duan et al. | 707/728 |
| 2012/0284259 A1* | 11/2012 | Jehuda | 707/722 |
| 2013/0006954 A1* | 1/2013 | Nikoulina et al. | 707/706 |
| 2013/0144878 A1 | 6/2013 | James et al. | |
| 2013/0326583 A1 | 12/2013 | Freihold et al. | |

OTHER PUBLICATIONS

Subharansu Maj; Large Scale Image Annotations on Amazon Mechanical Turk—Published Date: Jul. 1, 2011; http://www.eecs.berkeley.edu/Pubs/TechRpts/2011/EECS-2011-79.pdf.

"Website Helps Deaf Learn English with First-Ever Gesture-Based Dictionary", DCRE Labs, Jun. 13, 2005, 2 pages.

Douglas Turnbull et al., "A Game-Based Approach for Collecting Semantic Annotations of Music", International Symposium on Music Information Retrieval, Sep. 2007, 4 pages.

Final Office Action dated Jun. 29, 2015 in U.S. Appl. No. 13/329,165, 8 pages.

Non-Final Office Action dated Apr. 28, 2014 in U.S. Appl. No. 13/329,165, 8 pages.

Non-Final Office Action dated Dec. 4, 2014 in U.S. Appl. No. 13/329,165, 12 pages.

Non-Final Office Action dated Oct. 15, 2013 in U.S. Appl. No. 13/329,165, 8 pages.

Spiro et al, "Hands by Hand: Crowd-Sourced Motion Tracking for Gesture Annotation", IEEE Computer Society Conference on Computer Vision and Pattern Recognition Workshops, Jun. 2010, pp. 17-24.

Subhransu Maji, "Large Scale Image Annotations on Amazon Mechanical Turk", UCB Technical Report No. UCB/EECS-2011-79, Jul. 1, 2011, 11 pages.

* cited by examiner

DATA DISCOVERY AND DESCRIPTION SERVICE

CROSS-REFERENCE TO RELATED APPLICATIONS

This application is related to co-pending U.S. patent application Ser. No. 13/329,165 entitled, "GESTURE INFERRED VOCABULARY BINDINGS," filed on Dec. 16, 2011, the entirety of which is incorporated herein by reference.

TECHNICAL FIELD

The subject disclosure relates generally to facilitating discovery of data and community data enrichment by capturing and storing associations of data with vocabularies.

BACKGROUND

There is a vast amount of data available today and data is now being collected and stored at a rate never seen before. Further, through the employment of various systems such as the Open Data Protocol (Odata), data is being freed from specific applications and formats. As a result, data is becoming freely accessible and integrated into new uses.

However, although data may be accessible, a new user of the data may not know it exists. Although the user may employ a variety of search engines in attempt to find the data, if they do not employ the proper search terms or combination of terms, they may never come across it. Even if user finds a data set, they may not know what the data set is, let alone how to use it. For example, data created for a specific application may by structured and described in a unique way for that application. As a result, a new user of the data may have to spend time and resources parsing the data in order to determine what it is and how to use it. Further, after examining the data, the user may learn that the data is not what he/she wanted or that the data is not appropriate for his/her intended application. In addition, because data may be structured and described in different ways depending on the source of the data, searching for data can result in under inclusive or over inclusive results.

In addition, as more and more data is shared it can be assumed that multiple users will employ the same data sources. For example, multiple users will likely employ same data sources for similar applications in different manners, multiple users with employ different combinations of data sources, or multiple users will employ same data sources for different applications. However, there fails to exist a method to capture, learn from, and share, the various user applications and interpretations of data. In other words, any user interaction with data cannot be shared for interpretation and application in another context. In existing systems, the user must change the data and share the actual changed data. Therefore, any modification of usage of data or enhancement of the data is captured for one context of use with a specific application by the actual application.

The above-described deficiencies of today's techniques are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiment, the disclosed subject matter can relate to an architecture that can facilitate discovery of data and community data enrichment by capturing and storing associations of data with vocabularies. In accordance therewith, provided is a computer-implemented system, comprising an annotation component configured to receive a first annotation of data for a data source, wherein the first annotation comprises an association of a first global term with the data for the data source, a data store configured to store the first annotation, and an interface component configured to render the data based on the first annotation in response to a request for the data. In an aspect, the annotation component is further configured to receive a second annotation of the data for the data source, wherein the second annotation comprises at least one of a different association of the first global term with the data for the data source or an association of a second global term with the data for the data source, the data store is further configured to store the second annotation and the interface component is further configured to render the data based on the first and second annotations in response to another request for the data.

In another embodiment a method is provided comprising receiving annotations, wherein the annotations include associations of global terms with data of data sources, storing information, the information including, descriptions of the data sources, definitions of the global terms, and the annotations, and determining a subset of the information based on the annotations. In an aspect, the determining the subset of information includes receiving a global term and determining data sources that have the global term associated with the data thereof.

Still in yet another embodiment, disclosed is a computer readable storage medium comprising computer executable instructions that, in response to execution, cause a computing system to perform operations, comprising receiving annotations, wherein the annotations include associations of global terms with data of data sources, storing information, the information including, descriptions of the data sources, definitions of the global terms, and the annotations, generating subsets of the information in response to requests based on the annotations. The operations can include receiving selections of at least one of a data source, an annotation, or a global term included in the subsets, and tracking the selections. In an aspect, the operations further comprising determining a relationship between respective requests and respective selections, and determining the subsets of the information based on the relationship. These and other embodiments are described in more detail below.

BRIEF DESCRIPTION OF THE DRAWINGS

The system and methods for representing synchronization knowledge and/or partial knowledge for multiple nodes sharing subsets of a set of information are further described with reference to the accompanying drawings in which.

DETAILED DESCRIPTION

Introduction to Vocabularies

Figure 1:
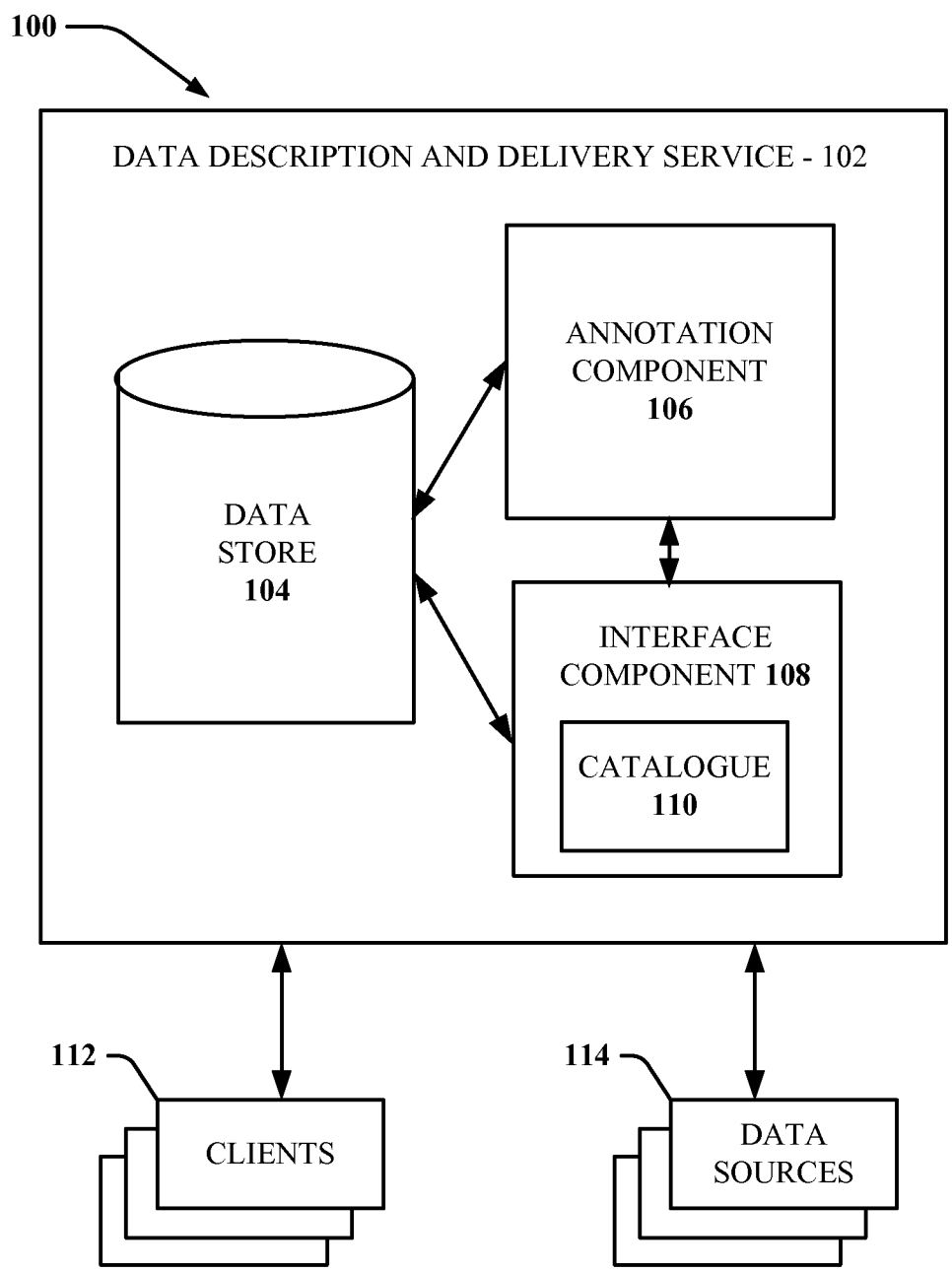
FIG. 1 illustrates a block diagram of an exemplary non-limiting system that can facilitate sharing of vocabularies to improve the consumption of data that has been associated with a vocabulary or global term.

Certain subject matter disclosed herein is directed to the use of vocabularies to facilitate discovery of data and community data enrichment. As used herein, the term data is employed to describe machine-readable data. In a traditional sense, a person's vocabulary is the set of words within a language that are familiar to that person. Each of the words for a particular language have an agreed upon meaning by those individuals whom adopt the language. The words of the language are used merely as the vehicle to express the agreed upon meaning behind them. Therefore, the more words a person acquires in her vocabulary, the better she can clearly express a concept to another individual who understands the meaning of a word employed. A person's vocabulary usually develops with age, and serves as a useful and fundamental tool for communication and acquiring knowledge.

The concept of vocabularies can be used as a tool for enabling communication and enrichment of machine-readable data. Our world is awash in data. Vast amounts exist today, and more is created every year. In order to capitalize on the value of data, various methods have been established that allow client applications and associated individuals to freely access data. For example, the Open Data Protocol, commonly called OData enables access to diverse data in a common way. OData is a network protocol for querying and updating data that provides a way to unlock data and free it from silos that may exist in applications. OData does this by applying and building upon existing world wide web (Web) technologies such as hypertext transfer protocol (HTTP), Atom Publishing Protocol (AtomPub) and JavaScript Object Notation (JSON) to provide access to information from a variety of applications, services, and stores. OData can be used to expose and access data from a variety of sources including but not limited to: relational databases, file systems, content management systems and traditional Web sites.

Vocabularies serve as a mechanism to allow producers of data to share more information in a way that can be intelligently understood on the consumption side, resulting in a higher fidelity experience for the consumer. In particular, vocabularies associate meaning with data such that when a client application recognizes a vocabulary associated with data, the client application can automatically understand how to read the data. For example, the consumer application Sesame Data Browser (Sesame) has been configured to render the results of OData queries on a map. Sesame does this by looking for specifically named properties in data embodied in a query result which it guesses represents an entity's location. However, because Sesame must guess which properties represents an entities location, the accuracy of the output is suboptimal. In order to solve the guessing problem, a vocabulary can be employed by the producer of the data to tell the consumer, (e.g., Sesame) which property is the entity's location.

Vocabularies are made up of a set of related global terms, which when used, can express some idea or concept. For example, different words can be employed to relay some idea, concept, or meaning associated with data. As used herein, these words are referred to as global terms. In an aspect, global terms can indicate attributes of data. For example, a global term can indicate whether something can be used as a title or a summary. In another aspect, global terms can indicate structure. For example, a global name can indicate the structure of a person's name and contact information. In an aspect, such a vocabulary can be a coined as a "person vocabulary" and have global terms for "first name," "last name," "surname," and so forth. The global terms can potentially describe a structure that can be mapped to some substructure of the data source for an Odata feed. The data source might include something called full name. In an aspect, the "person vocabulary" might parse the full name from space to space to map one field or property in the data to the multiple different terms of "first name," "last name," and "surname."

With regards to the Sesame browser "guessing" problem above, a "location" vocabulary could be employed to determine which property is an entity's location. For example, an OData query result may include actual latitude and longitude. In order for the Sesame browser to identify what properties of the query result are the actual latitude and longitude, a location vocabulary can be established and associated with the query results. Accordingly, regardless of what the actual latitude and longitude field is called in the results, as long as it is associated with global terms for latitude and longitude, the actual latitude and longitude can be identified by a client application who understands "location" vocabulary.

A conceptual schema definition language (CSDL) schema supports annotations, which can be used as an example to refer to a vocabulary and its global terms. In an aspect, if you ask for an OData services metadata (~/service/$metadata) you get back an entity framework conceptual model (EDMX) document that contains a conceptual schema definition language (CSDL) schema. For example, an EDMX document could be presented as the following:

```
<EntityType Name="Person" display:Title="Firstname Lastname">
    <Key>
        <PropertyRef Name="ID" />
    </Key>
    <Property Name="ID" Type="Edm.Int32" Nullable="false" />
    <Property Name="Firstname" Type="Edm.String" Nullable="true" />
    <Property Name="Lastname" Type="Edm.String" Nullable="true" />
    <Property Name="Email" Type="Edm.String" Nullable="true">
        <validation:Constraint>
            <validation:Regex>^[A-Z0-9._%+-]+@[A-Z0-9.-]+\.[A-Z]{2,6}$.</validation:Regex>
```

```
        <validation:ErrorMessage>Please enter a valid
EmailAddress</validation:ErrorMessage>
        </validation:Constraint>
    </Property>
    <Property Name="Age" Type="Edm.Int32" />
</EntityType>
```

When looking at the above EDMX document, the words EntityType can indicate the vocabulary. Global terms employed as part of the vocabulary can include Constraint and Title for example. Thus for the an EntityType vocabulary, the EntityType definition includes (but is not limited too) both a structural annotation (validation:Constraint) and a simple attribute annotation (display:Title).

The set of global terms for a vocabulary can be related in a variety of ways. For example, the set of related global terms can be related by the consumer application that generally applies the set of global terms, such as Microsoft™ Excel or Sesame. In another aspect, vocabularies can consist of global terms which serve a common purpose such as validation. In another aspect, a vocabulary can be employed to relate capabilities such as this column is writable, readable, nullable or updatable. In yet another aspect, vocabularies can consist of global terms that are grouped together based types. For example, a vocabulary based on type can include but is not limited to an of the following: a creative work vocabulary, and event vocabulary, an intangible vocabulary, an organization vocabulary, a person vocabulary, a place vocabulary, a product vocabulary, a display vocabulary, a relationships/social graph vocabulary, a catalogue vocabulary, etc.

It should be appreciated that a word or term used to identify a particular vocabulary can be entirely arbitrary. Employing names that already have meaning associated with them per the spoken English language, or other language for that matter, merely capitalizes on a pre-established association between words and the meaning many people already attribute to those words. For example, a vocabulary can be identified by a global term that includes numbers, symbols or made up words. The important thing is that the meaning behind the vocabulary and/or its' global terms is accepted by those who employ the vocabulary and/or global term.

In an aspect, each of the vocabularies described above based on type include at least one global term defining the type of vocabulary itself. For example, each of the terms creative work, event, intangible, organization, person, place, product, and display, relationships, can be considered a global term. In addition, as noted above, a vocabulary includes a set of related global terms. The related global terms of a particular vocabulary can include any conceivable, noun, verb, or adjective employed as a term to describe something that has been or can be related to the particular vocabulary type. For example, an event vocabulary can include global terms such as but not limited to; business event, children's event, comedy event, festival, food event, sports, event, schedule, calendar, speakers, etc.

In addition, each global term can also include a definition. In an aspect, the definition of a global term can include a literal definition. For example, the definition of the global term speaker could be "a person who serves as a presenter," or the definition of the global term display could be "a manner for presenting an object." In another example, terms in vocabularies can be formally defined. For example, the semantic web provides a common framework that allows data to be shared and reused across application, enterprise, and community boundaries. Vocabularies as described herein can expand upon the formal definitions created for terms employed by the semantic web. In addition, the definition of a global term can further include additional global terms, such as child components associated with the global term. In this respect for example, the global term speaker could include within the definition, a global term for fullname, first name, last name, speech, speech time, etc.

In another aspect, the definition of a global term can include associations to other global terms which could impart the same meaning as the global term itself such as a synonym of the global term. For example, with respect to the global term "speaker," a synonym global term could be "presenter" or "orator." In another example, For example, if global term is "address," its definition might include child components for street, give synonyms for address such as location or site, or give other global names that are not exactly address but are highly similar.

Regardless of the global terms employed and the definitions provided, as a whole, vocabularies simply establish a system for associating data under common names. As discussed infra, the term annotate as used herein refers to the assignment or association of a global term to data. Once data is associated with a global term, if the consumer recognizes the global term, the consumer will know how to read the data. Global terms are valuable because of their ability to be re-used. Given data, regardless as to whether the data does or does not have metadata associated there, association of a global term with that data can result in a blob of reusable metadata which consumer can bind to without having prior knowledge of the data itself. For example, several data sources could have the same global term applied to it. When a consumer employs those data sources, regardless whether the consumer knows any details of the underlying data, the data consumer can read and display the data in accordance with the global term associated therewith.

Vocabularies group global terms together so that application of a particular vocabulary results a convenient offering of the appropriate tools needed to express the idea or concept embodied in the vocabulary. These tools are the global terms themselves. Vocabularies allow producers of data to teach consumers of the data, richer ways to interpret and handle data. In this respect, vocabularies can range in complexity from simple to complex. A simple vocabulary might consist of a few or even a single global term and tell a consumer which property to use as an entity's title when displaying it in a form. On the other hand, a more complex vocabulary might describe a visit card (vCard) and its components or define min and max properties associated with a range term. In turn, application of the range term to an EntityType for example, could apply a value of a minimum of 1 a value of a maximum of 100.

Once data is associated with a global term, discovery of the data is facilitated through general knowledge of vocabularies. In addition, any use or improvements of data can essentially be captured through association of data with global terms. This output is captured and capitalized by Data description and delivery service as described in the remainder of the disclosure.

Overview of Data Description and Delivery Service

By way of an introduction, the subject matter disclosed herein relates to various embodiments for facilitating discovery of data and community data enrichment by capturing and storing associations of data with vocabularies. As discussed supra, these associations are referred to as annotations. Annotations include the assignment of one or more global terms to data of data sources, which are accessible by a network. When associated with data, global terms convey some idea or concept regarding the underlying data. This idea or concept can also model the data. As a result, at consumption, upon recognition of the one or more global terms assigned to data, the client can use the global terms it recognizes to influence how the client presents or otherwise processes the data associated with the one or more global terms.

Although data can receive an annotation, the annotation does not permanently fix to the data. In other words, annotations can be separated from data for a data source. As a result, data of a data source can be associated with multiple annotations. Further, anyone can provide annotations for data sources. As result, the body of annotations for data sources is a community effort. Data description and delivery service is configured to receive annotations and apply those annotations when interfacing client to data sources that have been annotated, regardless of where the annotations came from. Therefore, any client can receive richly described data from data sources that have been previously annotated. Accordingly, the entire community benefits from the collective annotations. In addition, a client can employ multiple perspectives on data for a single data source depending on the various types of annotations for the data source.

Data description and delivery service 102 links one or more data stores, which store these annotations, thus providing consolidated views of data. Therefore, although the actual data may be stored at a variety of locations, data description and delivery service 102 can provide information directing a client to data sources as well as provide any existing annotation on the data. In addition, the data stores can store a list of data sources or descriptions of data sources, and definitions of global terms. Data description and delivery service further provides an application program interface (API) in the form of an interfacing component to enable discovery of data based on annotations and provide clients access to annotated data from various data sources. Accordingly, interface component is configured to facilitate an enriched experience with and the consumption of data that has been annotated.

In order to facilitate discovery, via the interfacing component, data description and delivery service is configured to issue query results against the data store. For example, data description and delivery service is configured to the determine data sources that have a particular global term assigned to data originating therefrom. In another example, data description and delivery service is configured to issue query results indicating the global terms applied to data of a particular data source. In yet another example, data description and delivery service is configured to find data sources based on data annotated with related global terms.

Moreover, aspects of the disclosed subject matter facilitate tracking of user interaction with data description and delivery service to collect information that can be analyzed and employed in business intelligence schemes. In particular, annotations embody a user's interpretation and use of data. Multiple annotations can be analyzed to determine popular uses and interpretation of data sources. In addition, by tracking the consumption of data based on annotations some of the inferences that data description and delivery service can make include: popular perspectives on data, quality of those perspectives, associations between data sources, association between global terms, an popular global terms.

Data Description and Delivery Service

Referring now to the drawings, with reference initially to FIG. 1, depicted is a system 100 configured to facilitate sharing of vocabularies to improve the consumption of data that has been associated with a vocabulary or global term. Aspects of the systems, apparatuses or processes explained herein can constitute machine-executable component embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described In an embodiment, data description and delivery service 102 employs shared vocabularies to facilitate an enriched experience with data when consumed by clients 108. In an aspect, data description and delivery service 102 employs shared vocabularies to facilitate an enriched experience with data when consumed by client who have no prior knowledge of the data. An enriched experience with data when consumed refers the consumption of data that has been pre-coded with one or more global terms. As noted above, the global terms convey a preconceived meaning. When associated with data, global terms convey some idea or concept regarding the underlying data. As used herein, the term annotate refers to the assignment or association of a global term to data. As a result, at consumption, upon recognition of the one or more global terms assigned to data, the client can employ the idea or concept embedded in the one or more global terms. For example, the one or more global terms could define an identity of the underlying data, a manner for use of the data, a manner in which to display the data, a manner in which to interpret the data, or a manner in which to organize the data. In this respect, where the client has knowledge of the meaning of a global term, the client will automatically know how to read or consume annotated data.

In addition, data description and delivery service 102 employs shared vocabularies to facilitate discovery of data and facilitate annotating data. In order to facilitate discovery of data, data description and delivery service 102 is configured to issue query results based stored annotations of data for data sources. For example, data description and delivery service 102 can determine data sources which have a particular global term assigned to data originating therefrom. In another example, data description and delivery service 102 is configured to issue query results indicating the global terms applied to data of a particular data source. Still in yet another example, data description and delivery service 102 can employ definitions of global terms to generate a query with related global terms. In an aspect discussed infra, data description and delivery service 102 can also employ definitions of global terms to facilitate annotating data.

Some of the above noted features and advantages of the subject data description and delivery service 102 are embodied in the following example. Suppose a user opens Excel, a client application, and desires to search for data that she wants to use in a spreadsheet document. In order to find data, the user launches a data catalogue 110 that enables the user to look through various data sources. In an aspect, the data catalogue 110 is integrated within the data description and delivery service 102, as depicted in FIG. 1. In another aspect, the data catalogue 110 is external to the data description and delivery service 102 and made accessed through a client application such as Sesame browser. Still in yet another aspect, the data catalogue 110 is merely a list of data sources displayed in a browser following a query to the data description and delivery service 102 via interface component 108.

When the catalogue 110 opens, the user can look through data sources available. For example, these data source can include Odata feeds. In an aspect, the user can employ search terms to find data sources. In particular, as described supra, the user can request data sources that apply a particular vocabulary or a particular global term. For example, the user may request and receive Odata feeds for human resource data.

The human resource data can be identified by the data description and delivery service 102 based on a vocabulary or global term that has been linked to the human resources data and which represents human resource data.

However, rather than just receiving one or more uniform resource locator (URL) links to the human resources data, the data description and delivery service 102 can provide a description of the data. For example, the description could indicate that "this is human resources data source," or "this is human resources data comprising a list of name and contact info for persons," or "this is human resources data for Company X." Further, if the user chooses to look at a particular URL link for a data source, the user could receive detailed information such as titles for elements of the human resources data. Then the user could select the URL link and receive sample data for use in Excel. For example, assuming the human resources data includes people data, the sample data could include rich information enabling display of first names and last names and secondarily titles in an Excel spreadsheet. Further, the sample data could provide various visualizations of the data including multiple pivots of the data. For example, based on the annotations of the data, there could be various views of data such as a Vcard, a chart, or a graph. The user can then look at the details and different views to determine whether the data source includes data the user wants to employ. She could the select the data source and in particular, data from the data source annotated in a particular way.

As embodied in the above example, data description and delivery service 102 provides access to sufficient metadata so to enrich the visualization experience around otherwise unknown data. For example, in the above example, it can be assumed that Excel was not hardwired to a human resources data catalogue and that Excel did not know about the types of entities defined by the human resources data. It can also be assumed that Excel also did not know about the semantics of what a title is or what a person is. Nevertheless, by employing the data description and delivery service 102 to discover data sources, the user can receives not only a desired type of data but also "skin" and a "body" and a "face" the data which enhance the client's experience with the data.

In an embodiment, in order to facilitate the above noted enriched experiences with data and the discovery of data that offers those enriched experiences when consumed, data description and delivery service 102 employs data store 104, annotation component 106, and interface component 108. In an aspect, interface component 108 can further include data catalogue component 110. The data catalogue 110 may be integrated within the data description and delivery service 102, as depicted in FIG. 1. In another aspect, the data catalogue 110 is external to the data description and delivery service 102 and made accessed through a client application such as Sesame browser via the interface component 108. Still in yet another aspect, the data catalogue 110 is merely a list of data sources displayed in a browser following a query to the data description and delivery service 102 via interface component 108.

Data store 104 is configured to store information regarding locations and structure of data, (i.e. data sources 112), and any additional information describing the data by way of vocabularies that have been applied to the data, such as lineage or authorship. Further, data store 104 is configured to store rich information about global terms and vocabularies through definitions of the global terms and associated vocabularies. In an aspect, the information stored by data store 104 is centrally available through data description and delivery service. For example, data store 104 can be provided on a server computer that can be accessed via a network. The network can be public or private. According to this example, data store 104 can be provided on a server computer that integrates data description and delivery service 102. In another aspect, data store 104 can include a federation of multiple data stores internal and/or external to data description and delivery service 102. According to this aspect, a plurality of data stores 104 can serve as "central" locations of data, such a store for a primary data description and delivery service, and a "central" store for a company. However, each of the data stores can be accessed via data description and delivery service 202 to enable consolidation of views on data via their annotations.

Similarly, in an aspect, data description and delivery service 102 can be provided in a public or private environment/network. For example, a private entity may employ a data description and delivery service which facilitates discovery of data and shared perceptions of data associated with the entity. According to this aspect, the entity may recognize various vocabularies and/or global terms which are affiliated with the entity and/or defined by the entity. In another aspect, data description and delivery service can be employed by a variety of clients 112 over a public network, such as the world wide web.

Annotation component 106 is configured to receive an annotation of data for a data source. Interface component 108 is configured to provide clients 112 access to the data store 104. In an aspect, interface component 108 enables a client 104 to query the data store 104 based on the information held therein. In another aspect, interface component 108 is further configured to present query results in the form of a catalogue 110. The query result can include a URL link to specific data of a data source as well as access to additional metadata embodied in the annotations applied to the data.

In an aspect, data store 104 holds three categories of information. The first category includes the location of data. There are many possible sources of data. Applications collect and maintain information in databases, organizations store data in the cloud, and many firms make a business out of selling data. In an aspect, data is located at an entity or service that produces the data. In another aspect, data is located at an entity or service that publishes the data. As used herein the location of data includes the data source 114. Data sources are accessible by a computing network such as the world wide web, the internet, or intranet. In general, data sources are identified by a uniform resource identifier (URI) that includes a specific URL and uniform resource name (URN). Data sources 114 are discussed in greater depth supra.

The second category of information includes held in data store 104 includes definitions of vocabularies and the global terms included in those vocabularies. The definition of a global term encompasses a description the meaning of the global term. In an aspect, the definition can serve to identify the data. In another aspect, the definition can be descriptive and indicate how the global term is to be applied to data and the resulting output of the data when associated with the global term. Definitions can further include associations between vocabularies and global terms. For example, a vocabulary can employ a distinct nomenclature comprising of particular set of global terms. The definition of a vocabulary can include all of the global terms of that vocabulary and the also the definitions of those global terms themselves. Furthermore, the definition of a global term can include rich information regarding associations between the global term and other global terms and data sources. For example, a definition of a global term can include child components of the global term, synonyms of the global term, and related global terms. In another aspect, as described infra, the definition of a global term can include parameters of use in the form of filters.

The third category of information includes annotations. As noted supra, an annotation includes the assignment of a global term to data of a data source. In an aspect, annotations can be thought of as the mapping of vocabularies and global terms to data sources. When a vocabulary is applied to a data source, one or more global terms of that vocabulary is assigned to data of the data source. The assignment of a global term to data indicates how a global term is used for a data source. In an aspect, when a data source is annotated, a file or document is generated that includes metadata outlining how a global term is applied to the data. In addition, the metadata can include additional rich information including definitions of global terms and associations between other global terms.

By providing annotations in data store 104, those annotations can be made centrally available through the data description and delivery service 102. Accordingly, whenever another client works with a particular data source, the client can choose to employ any previous annotations of the data. For example, data from data source X could be marked or annotated with the global term "company name." In an aspect, when a client works with data from data source X, the concept or idea imparted by the global term "company name" on the data can be offered to the client. For example, the data assigned to the global term "company name" could be presented in an underlined fashion. In another aspect, data from data sources Y and Z could be annotated with the global term "company name." Regardless of the meaning the global term "company name" imparts on a client application which interprets the global term "company name," it is possible that advantages may lie in combining sources X, Y and Z based on the global term "company name." Thus because data sources X, Y, and Z have been annotated with the global term "company name," a client can discover the relationship between the three sources.

Annotation component 106 is configured to receive as input, annotations of data for a data source. In an aspect, annotation component receives annotations of data for a data source in the form of a file document in response to data being annotated. In another aspect, annotation component 106 generates an annotation file for data source in response to data being annotated by a user or client application. The annotations or annotation files can then be stored in data store 104. The annotation file can include any metadata associated with the data including the assignment of vocabularies and global terms to data of a data source in the form of metadata.

In an aspect, annotation component 106 receives an annotation for a data source when the annotated data is published by the data source. For example, data sources 114 can include a centralized space for sharing documents over a public or private network. In an aspect, a data source can include SharePoint site. SharePoint is a content management system developed by Microsoft™ Corporation. SharePoint™ allows groups to set up a centralized, password protected space for document sharing. Documents can be stored, downloaded and edited, then uploaded for continued sharing. Accordingly, in an aspect, clients can annotate data locally and store the annotated data in a local database. The client could further choose to publish the data to a public sharing site such as a SharePoint™ site. When the data is published, an annotation file associated with the data is also published and linked to the data source by the annotation component 106. In another aspect, annotation component can extract annotation files associated with data sources.

Data can become annotated in a variety of ways. In an aspect, the manner in which a data source becomes annotated does not affect the future application of those annotations by data description and delivery service 102. In particular, data description and delivery service 102 serves a marketplace for the input of semantic information regarding data in the form of annotations and the output of additional information regarding the data based on those annotations. In an aspect, a user of a client device or client application can manually annotate data. For example, an individual say Anna, could use data from a particular data source when working in an Excel spreadsheet. In an aspect, Anna could annotate the data with global terms as she is working with the data. For example, she could apply terms of a display vocabulary and indicate a particular object is a "title," and another object is a "summary." In an aspect, client applications understand that the global term "title" indicates displaying the object in bold and the globe term "summary" indicates displaying the object in italic in a position following the title. In the above example, Anna has applied a display vocabulary including the terms "title" and "summary" to data of a particular data source, say data source A. With the subject data description and delivery service, this application of vocabularies to data source A can be received by annotation component 106 and stored in data store 104.

In another aspect, a client device or application can employ an inference engine to facilitate applying a global term to data. According to this aspect, the inference engine can be associated with the client application or with the data description and delivery service 102. As discussed infra, data description and delivery service can also include an analysis component and an inference component. These components can analyze annotations and employ tracked data regarding user interaction with the data description and delivery service 102 to make conclusions regarding definitions of global terms, relationships between global terms, and relationships between data sources. Further, analysis and inference components can apply these conclusions regarding global terms and data sources to new user contexts to facilitate annotating data. For example, a user of a client application may manually annotate data with the "zipcode" global term. As a result, the client application can employ data description and delivery service 102 to receive other related global terms that are commonly employed with the "zipcode" global term and use those other related global terms to annotate the data. For example, the client application can automatically annotate the data or the client application can suggest annotations for the data.

According to the embodiment above, the client application can let the data description and delivery service do the work and use data description and delivery service 102 to extract conclusions regarding global terms and/or suggested annotations of data. In another aspect, client application can track user interaction with the software and can employ analysis and inference components to facilitate suggested or automatic annotations of data data with based on assumed meaning of the data, relationships between a global term employed and other global terms. Further, a client application may make gesture based inferences regarding a possible annotation of data and automatically annotate the data based on the inferences.

The above example with Anna demonstrates how data of a data source can become annotated with an annotation of one kind. However, data of a data source can receive a plurality of annotations which may vary in kind. Because global terms impart different meanings, assigning different global terms to data or different combinations of global terms to data can cause a client application to render data in different forms and dimensions of complexity and richness. As a result, when data is annotated it is modeled through the association of global terms to the data. As noted above, related global terms express some idea or concept about the underlying data. As used herein, the idea or concept expressed by annotated data is referred to as a perspective on data.

A perspectives on data can embody the manner in which annotations on the data influence the way it is consumed and result from the manner of the annotations on the data for a data source. For example, the manner in which data is annotated can influence the way data is viewed, the possible values that its individual components can take during editing (i.e. range checking), weather the application allows data sets to be combined and over which attributes, etc. A data model is dependent on the annotations on data the client functionality. For example, a data model can include the manner in which data is viewed on a client device which is dependent on the application of the data by the client device and the recognition of global terms in an annotation which facilitate the application.

In an aspect, multiple views on data may exist for data of a single data source. For example, data of data source may be annotated by different clients or by the same client on different occasions. Accordingly, data of a data source can have multiple annotations with assignments of different global terms. For example, a client application may annotate data of a data source with the term "calendar," and another client application may annotate the data of the data source with the terms "agenda" and "room assignment." In another aspect, data of a data source can have a plurality of annotations that include application of the same global terms, however the configuration in which the global terms are applied to the data of the data source can vary. For example, a first user or client may assign global terms "one," "two," and "three," to data objects "one," "two," and "three" respectively. In another aspect, a second user or client may assign global terms "one," "two," and "three," to data objects "twelve," "four," and "thirty two," respectively.

In addition, as noted infra, vocabularies can range in complexity from simple to complex. Accordingly, perspectives on datacan range in complexity from simple to complex. A vocabulary can include a single global term or multiple global terms. A simple vocabulary might tell a client which property to use as an entity's title when displaying it in a form, whereas a more complex vocabulary might tell someone how to convert an OData person entity into a vCard entry. Further, the degree to which data is annotated can range from low to high. For example, data can be annotated with a single global term which conveys a simple meaning regarding the display or use of the data. However, the data can also be annotated with a plurality of global terms and vocabularies, each of which convey additional layers of meaning regarding the underlying data. Therefore, because data of a data source can be annotated in a variety of manners, data of a data source can adopt multiple perspectives on data.

In view of the above, according to another embodiment, annotation component 106 is configured to capture multiple annotations for a single data source or a particular set of data and store the annotations in data store 104. In other words, annotation component 106 is configured to compile a plurality of annotations for a single data source. According to this aspect, each time data is annotated by one or multiple clients, the data is enriched with metadata. Regardless of the manner in which data becomes annotated, the annotations are captured by annotation component 106. In this respect, data and/or data sources providing the data can grow in richness of information associated with that data overtime. As a result, impressions, thoughts, applications, and modifications of data and data sources by multiple users can be captured and shared. In other words, multiple users can mark up data, make modifications to data, use data in different ways, view data in different ways, make conclusions about data, combine data from various sources etc. As a result, multiple users can provide perspectives on data and those perspectives can be captured through annotations on the data. Because those annotations are stored in data store 104, those annotations can be shared.

For example, in furtherance to the example above with Anna and data source A, suppose another individual Bob utilized data source A and also applied annotations to data. For example, suppose the data source which Anna annotated with the global term "title" further includes a plurality of company locations in the form of addresses. Then suppose Bob works with the data source in Excel and uses the various company addresses. He further annotates the company addresses with a global term for "address." As a result, certain data of data source A is also annotated with the global term "address." At this point, data source A has two perspective consumption modes.

Then suppose another individual "Carla" chooses to employ data source A. In an aspect, Carla can view data source A according to both perspective consumption modes. Depending on the client application Carla employs to consume the data from data source A, the annotations applied will result in a rendering of the data in a certain form. For example, if Carla is working with Excel she may be able to view the data with titles already bolded and summaries attached and address information applied. In another aspect, she may employ an application which recognizes the "address" global term and automatically presents Carla with a map having the locations of the addresses charted out. Carla can then choose the perspective on data source A which best suits her needs for a particular client application.

Previous systems that captured improvements to data did not include a federation of well-known service endpoints that could be used to capture and share information related to the improvement. As a result, changes, thoughts, and impressions on data could not efficiently be shared with other applications. However, the subject data description and delivery service 102 captures user interaction with data so that enrichments to data can be shared with future users of the data. Enrichments to data include any thoughts, conclusions, uses, interpretations, modifications, and associations to data. Enrichment of data is captured through the association of global terms to the data to which represent a thought, conclusion, use, interpretation, modification or association of the data. Through employment of data description and delivery service 102 in conjunction with of use of the service by multiple clients 112, the many clients 112 that can capture augmentation events of data and send them to the data store 104 in the form of annotations. Further, any of the clients 112 can openly access such augmentations via the service 102.

In summary, annotation component 106 can compile annotations of data for a particular data source regardless of the way in which data receives the annotations. Because those compiled annotations are stored in data store 104, whenever another client works with a particular data source, the client can choose to employ any previous annotations of the data. The client could also choose not to employ any previous annotation of the data and simply use the data in raw form. As a result, the client can receive a different experience with the data depending on any previous annotations of the data. In this respect, data enrichment can be shared via the application of vocabularies to data of a data source.

Interface component 108 is configured to serve as an application program interface (API) that enables discovery of data based on annotations and provide clients access to data comprising annotations. Accordingly, interface component 106 is configured to facilitate an enriched experience with and the consumption of data which has been annotated. In addition, inference component 108 is configured to find global terms that can be employed to annotate data. For example, interface component 108 can receive a global term and find related global terms. In another example, interface component 108 can receive search terms or phrases and parse the definitions of global terms to return possible global terms that correspond to the search terms or phrases. The possible terms can then be employed by the client application to annotate data.

In an aspect, interface component 108 is configured to issue search queries against the contents of data store 104 based on any of the three types of data stored in data store 104. Therefore, interface component 108 can receive a request for data sources which have a particular vocabulary or global term applied to it. For example, interface component 108 could receive a request for all the data sources which have the global term "movie" applied. In another example, interface component 108 could receive a request for all of the global terms that have been applied to a particular data source. In another example, interface component 108 could receive a request for global terms which are related to or commonly applied in an associated relationship with a specific global term. Relationships between global terms including synonyms and related terms are provided in the second category of data in data store 104, definitions of global terms. Accordingly, interface component 108 can parse a definition of a global term to determine additional information about the global term. (Definitions of global terms are discussed in greater depth infra).

Interface component 108 is further configured to produce a query result comprising the requested information. In turn, client applications can select or employ a data source identified and produced by the interface component 108. In particular, the data source can have annotations associated therewith to facilitate an enriched experience with the data of the data source. In an aspect, an annotation file or document can be retrieved by the interface component 108 from data store 104 in response to selection of a particular data source by a client. In another aspect, the annotations file or document associated with a data source can facilitate a plurality of interpretations or uses of the data source embodied in various perspectives on the data. According to this aspect, interface component can provide multiple views of different perspectives on datafor a selected data source based on the annotations applied.

In an embodiment, the interface component 108 produces a query result in the form of a catalogue 110 comprising a list of URL links to data sources comprising the requested information. In another aspect, the catalogue 110 can include additional details regarding a data source and/or the data provided by the data source for a particular link depending on the annotations associated with the data source. In yet another aspect, interface component 108 can further provide URL links to multiple versions of perspectives on datafor a data source depending on the number of annotations for a data source. According to this aspect, a data source may have multiple annotation files associated therewith, including one for each perspective on data generated via the different annotation files. Alternatively, a data source may have a single annotation file that complies multiple annotations of the data source and thus the multiple associated perspectives on data.

Referring back to FIG. 1, in addition to data description and delivery service 102, system 100 includes clients 112 and data sources 114. In general, the term client 112 is used herein to refer to an entity, individual, or computer application, which utilizes annotated data or annotated data sources. The term data source 114 is used to refer to an entity, service, or application that provides data. The data can be annotated or not annotated, however the data is useful with the subject data description and delivery service upon annotation. Nevertheless, it should be appreciated that a client 112 can generate sources of annotated data. For example, a client can annotate data and publish it as a data source. In another example, a client can utilize annotated data from a data source and further annotate the data in association with additional actions with the data, impressions upon the data, and modifications to the data.

In an embodiment, clients 112 can include any application operating on a computing device configured to consume data. In an aspect, a client can include a computing device employing an application that consumes data. The computing device can be associated with a user. For example, a client device could include a personal computer (PC), a tablet PC, a laptop computer, a server computer, a phone, a smartphone, etc. In another aspect, the term client is can refer to an actual individual user of the data via an application. In an embodiment, the application can include any custom application that uses data such as applications on mobile devices, business intelligence (BI) tools, media programs, etc. In another embodiment, application consume data exposed using the OData protocol. Applications that can consume data exposed using the Odata protocol can include but are not limited to: browsers, OData Explorer, Microsoft™ Excel, VisualStudio, LinQPad, Sesame Browser, Client Libraries, OData Helper for WebMatrix, Tableau, Telerik RadGrid for ASP.NET Ajax, Telerik RadControls for Silverlight and WPF, Telerik Reporting, Database .NET v3, Pebble Reports, and (Unofficial) SSIS import script. It should be appreciated that the above list of Odata clients is merely presented as an example of type of applications which consume data, specifically Odata. The subject disclosure however contemplate all applications which consume data regardless as to whether the data is exposed using the Odata protocol or not.

Data sources 114, include any possible source of data that can be accessed via a network. There are many possible sources of data. For example, applications collect and maintain information in databases, organizations store data in the cloud, individual produce personal data and store it locally, and many firms make a business out of selling data. In an aspect, a data source can includes numerous amounts of different types of data at a specific location. The specific location is generally identified by a URL. In an aspect, a data source includes a service configured to expose data using the Odata protocol. It should be appreciated that any service, individual, program, website, etc. can be configured to expose data using the Odata protocol. Some examples applications that expose Odata data sources include but are not limited to: SAP NetWeaver, GatewaySharePoint 2010, IBM WebSphere, Microsoft SQL Azure, Microsoft Dynamics CRM 2011, Geo-REST, Webnodes CMS, Telerik OpenAccess ORM, and tm2o—OData provider for Topic. Some examples of live Odata data sources include, Facebook Insights, ebay, Netflix, twitpic, Wine.com, Nuget, Nerd Dinner, Windows Live, and Microsoft Pinpoint.

It should be appreciated that the above noted clients and data sources that have conformed to the Odata protocol are merely provided as examples of the wide range of possible clients and data sources that can be employed by the subject data description and delivery service. As such, additional clients and data sources are contemplated as the Odata ecosystem continues to grow.

Figure 2:
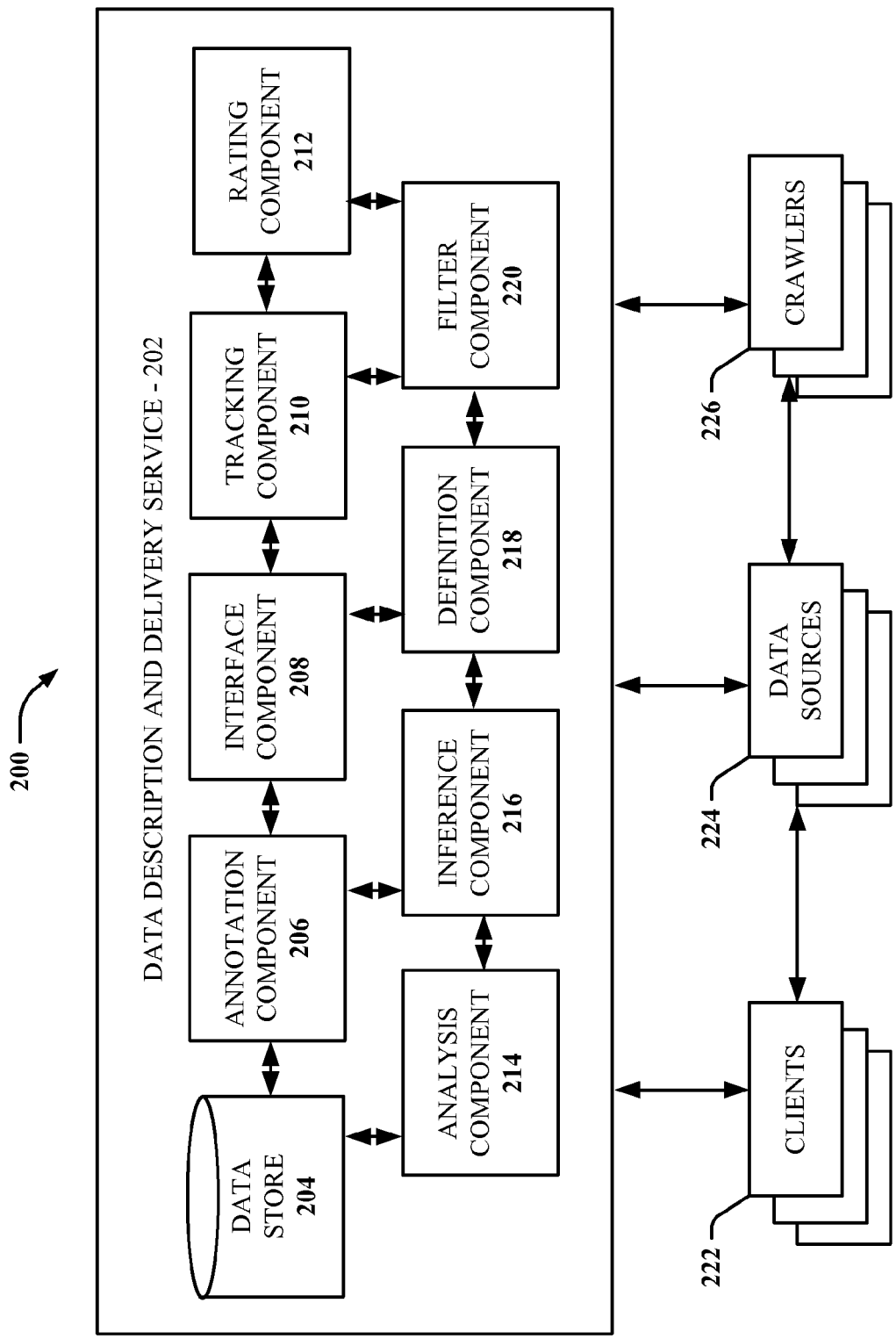
FIG. 2 illustrates a block diagram of another exemplary non-limiting system that can facilitate sharing of vocabularies to improve the consumption of data that has been associated with a vocabulary or global term.

Referring now to FIG. 2, depicted is a system 200 configured to facilitate sharing of vocabularies to improve the consumption of data that has been associated with a vocabulary or global term. Similar to system 100, system 200 includes data description and delivery service 202, data store 204, annotation component 206, interface component 208, clients 222 and data sources 224. In an aspect, data store 204, annotation component 206, interface component 208, clients 222 and data sources 224 are analogous to data store 104, annotation component 106, interface component 108, clients 112 and data sources 114. In addition, data store 204, annotation component 206, and interface component 208 are configured to include additional features as noted infra with respect to the additional components of data description and delivery service 202. In particular, data description and delivery service 202 further includes tracking component 210, rating component 212, analysis component 214, inference component 216, definition component 218, and filter component 220. Further, system 200 can include one or more crawlers 226.

In an embodiment, tracking component 210 is configured to track annotations of data sources and client interaction with data description and delivery service 202. Any information monitored or tracked by tracking component 210 can be collected and stored in data store 204. With respect to annotations of data sources, in an aspect, tracking component 210 is configured to monitor the number of times a data source is annotated and the various perspectives on data generated via the annotations. In another aspect, tracking component is configured to track what global terms are applied to data of a data source, how often they are applied, when they are applied and who or what entity applies them. In another aspect, tracking component 210 is configured to track usage requirements and parameters associated with data annotations. For example, tracking component is configured to determine languages of annotations and client application requirements that employ the annotations.

With respect to client interaction with data description and delivery service 202, tracking component 210 is configured to track the actual consumption of annotated data from data sources. As described supra, interface component 108 (and likewise interface component 208) is configured to present a client a query result which can include URL links to annotated data sources. In an aspect, interface component 108 or 208 can further provide URL links to multiple versions of perspectives on data for a data source depending on the number of annotations for a data source. In an aspect, tracking component 210 is configured to track the consumption of annotated data sources. For example, tracking component 210 can determine when an annotated data source is selected and/or employed by a client. According to this example, tracking component may determine data source A is selected once an hour, once a day, once a week, etc. In another aspect, tracking component 210 can track the consumption of data according to the various perspectives of the data. For example, a data source may have several perspective consumption modes or multiple data sources may have perspective consumption modes that relate to a similar type of data. Tracking component 210 can thus track client selection and consumption of data according to various perspective consumption modes on the data from one or multiple data sources. Further, in yet another aspect, tracking component 208 can monitor the identities of clients that employ data sources and the annotations on the data which they employ (i.e., the resulting perspective on the data that the client employs).

In another embodiment, with respect to client interaction with data description and delivery service 202, tracking component 210 is configured to track client or user patterns with respect to consumption of data from data sources based on annotations and the definitions provided for the global terms of those annotations. For example, data description and delivery service 102 and 202 enables users to discover data sources employing related annotations as outlined in the definitions of global terms. For example, the definition of a global term can include synonymous global terms and/or global terms which are related to a global term (child components of the global term), such as other global terms grouped with the global term by a vocabulary. Therefore, according to an aspect, tracking component 210 is configured to track selection and use of data sources based on like terms or related terms. For example, a user or client may discover two or more data sources employing a common term or a related term and choose to join the two or more data sources at consumption. According to this example, tracking component 210 is configured to monitor when data sources are commonly employed together by a client application.

It should be appreciated that the above examples of information that tracking component 210 is configured to collect are merely indented to present examples of some of the types of information tracking component 210 may collect. It should be appreciated however that tracking component 210 is configured to track any type of user interaction with a data source based at least in part on the association of data of that data source with one or more global terms. The information tracked by tracking component 210 can further be stored in data store 204 for future access and analysis.

In addition, system 200 can include one or more crawlers 226. In an embodiment, a crawler 226 traverses the network in which data description and delivery service operates to gather information to enhance the service 202. For example, a crawler 226 can browse the World Wide Web in a methodical, automated manner or in an orderly fashion to find data sources and load descriptions of those data stores into data store 204. In another aspect, crawler 226 can capture contextual information associated with a data source or attributes of a data source (such as usage history) and load the information in data store 204. One thing missing in this drawing is the crawlers. In an aspect, crawlers 226 can sit between the data sources 224 and an instance of the data description and delivery service.

Rating component 212, is configured to enable users of the data description and delivery service 202 to rate annotations of data sources based on the perspectives on data flowing from those annotations. For example, as noted supra, a data source can include a plurality of annotations and thus embody a plurality of perspective modes of consumption. Rating component 212 allows users to rate a particular perspective. In another aspect, rating component 212 is configured to enable users to rate individual global terms and vocabularies. Still in yet another aspect, rating component 212 is configured to enable users to rate data sources based on the overall quality of the data and data consumption mode/perspective offerings. The ratings received by rating component 212 can further be stored in data store 204 for future access and analysis.

Analysis component 214 is configured to analyze data in data storage 204 in order to make conclusions about data, data sources, definitions of global terms and annotations based on the information held in data storage 204 which. These conclusions can be employed by the service to enhance the objective of the service. In another aspect, these conclusions can be employed by business intelligence systems. Still in yet another aspect, the conclusions can be employed by client applications to facilitate annotating data. As noted supra, tracking component is configured to track any type of user interaction with a data source based at least in part on the association of data of that data source with one or more global terms. The information tracked by tracking component 210 can further be stored in data store 204 for access and analysis by analysis component 214.

According to an embodiment, analysis component 214 is configured to employ tracked data and annotations to determine the following: the degree of popularity of a perspective on data, the quality of a perspective on data, the popularity of a global term, the array of global terms applied to a data source, the reputation of a perspectives on data, the clientele distribution of consumption of a data model, the reputation of a data source, the frequency and timing of consumption of a perspectives on data, or the location of consumption of a perspective on data. For example, the degree of popularity of a perspectives on datacan be determined by one or more algorithms that accounts for any the number of times a perspectives on datais consumed. In another aspect, the quality of a perspectives on datacan account for the number of times the perspectives on datais employed, the rating of the perspectives on data, and the clientele distribution of consumption of the perspectives on data. Further, analysis component 214 can employ statistical analysis to associate percentages with conclusions. For example, analysis component 214 can determine the percentages associated with global term or vocabulary usage against a data source as compared to other global term or other vocabulary usage. In an aspect, analysis component 214 can make the above determinations on a routine basis and store the determinations in data store 204. In another aspect, analysis component 214 is configured to perform the above determinations in response to query requests.

Interface component 208 can further employ conclusions regarding perspectives on data, global terms and data sources as parameters when performing queries against data store 204. As a result, clients and users can request and receive rich business intelligence information based on any of the conclusions made by the analysis component. In an aspect, the data description and delivery service 202 can sell the above noted rich business intelligence information. In another embodiment, data description and delivery service 202 can employ conclusions made by the analysis component 214 to optimize user data queries. For example, analysis interface component 208 can not only offer data sources which include a select global term or terms, but also the ratings of the data sources, indication of the quality of those data sources and indication so the degree of complexity of a particular perspective on data affiliated with those data sources.

In another embodiment, analysis component 214 is configured to employ tracked data to identify information that can be employed in the definitions of global terms. As a result, analysis component can generate definitions of global terms. The definition can further include a profile of the global term including any conclusions about the use, meaning, or associations of the global term. For example, analysis component 214 can examine annotations to analyze trends in the application of global terms against certain types of data. Similarly, analysis component can identify when data sources are merged based on different user selected global terms to identify a relationship between the terms. Analysis component can further make conclusions about the data sources based on the merge. For example, a client application can choose to merge data source A with data source B based on a common annotation scheme or a related global term. In addition, any rich information known regarding data source A can now be associated with data source B. For example, suppose data source A had people data. Analysis component can further note that data source B relates to people data as well.

In addition, analysis component 214 is configured to analyze annotations to identify patterns for uses of global terms and structure of the underlying data. For example, analysis component 214 is configured learn associations between global terms and the underlying data structure. In another aspect, analysis component 214 is configured to examine which global terms which are employed together and how they are employed together, to determine relationships between the global terms. For, example, analysis component 214 can examine annotated data to extract relationships between global terms. Further, analysis component 214 can employ statistical analysis to associate percentages with conclusions regarding global term relationships. For example, analysis component 214 can learn that in 80% of the time the "zipcode" annotation is followed by a "map" annotation. Furthermore, analysis component can employ tracked user interaction with the data description and delivery service to discern associations between global term and data sources. Accordingly, analysis component 214 can employ tracked user patterns and annotations to identify related global terms, similar global terms, and synonymous global terms. Related global terms can include any global terms which have a similar meaning, similar applications, harmonious application or other relationship. Synonymous global terms can include terms which mean the same thing and convey the same concept or idea. It should be appreciated that global terms in different languages may be synonymous.

Further, as discussed below, the definitions of global terms can include requirements for consumption of data annotated with the global term. For example, client applications or devices may not support the consumption modeexhibited by an annotation with a particular global term. According to this aspect, analysis component 214 can use tracked information indicating what client application or device generated an annotation to identify appropriate restrictions for future consumption of the data. In another aspect, certain data consumption modes might be inappropriate in for use in certain contexts or environments. According to this aspect, analysis component 214 can use tracked data indicating location and/or context of consumption of a perspectives on datato determine restrictions for applications of perspectives on dataand or global terms. Interface component 208 can further employ the conclusions regarding restrictions for consumption when issuing query results to a client. For example, a query result can red flag data sources and perspectives on data which may not be appropriate for a client or simply not offer those data sources and perspectives on datato the client.

In yet another embodiment, analysis component 214 is configured to employ conclusions regarding associations between global terms to facilitate annotating data. According to this aspect, analysis component 214 can facilitate suggested annotations of data sources and/or automatic annotations of data sources. For example, it is possible that a data source is never annotated or minimally annotated. Analysis component 214 is configured to interpret the structure of the un-annotated data and based on observed annotations of similarly structured data, analysis component 214 is configured to fill in the gaps. For example, analysis component 214 can generate suggested annotation of data sources or automatically annotate the data. In another aspect, a client application can annotate data with a first global term. Once the data has a first global term applied, the data description and delivery service via the analysis component 214 can profile the data term to determine additional possible global terms or vocabularies that the client may want to employ.

Inference component 216 is configured to assist analysis component 214 in making conclusions regarding data, data sources, definitions of global terms and annotations based on the information held in data store 204. In an aspect, inference component 216 is configured to employ data in data store 204 to determine the following: the degree of popularity of a perspective on data, the quality of a perspective on data, the popularity of a global term, the array of global terms applied to a data source, the reputation of a perspective on data, the clientele distribution of consumption of a perspective on data, the reputation of a data source, the frequency and timing of consumption of a perspective on data, or the location of consumption of a perspective on data. Inference component can further assist analysis component 214 when determining possible annotations for data sources. For example, inference component can account for a variety of factors such as the type of client application, the type of data, the location of the client, the requirements of the client device, recent popular global terms, and/or user preferences, in order to suggest appropriate annotations for data sources.

Inference component 216 employs explicitly and/or implicitly trained classifiers in connection with performing inference and/or probabilistic determinations and/or statistical-based determinations as in accordance with one or more aspects of the disclosed subject matter as described herein. For example, the inference component 216 can employ previous annotations of data sources and compare them with annotations of other data sources to automatically determine new annotations of data sources. In another aspect, inference component 216 can infer likely joinings of data sources based on patterns recognized in previous joinings. As a result, data description and delivery service 202 can suggest possible combinations of data sources.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference component 216 can be employed to identify a specific context or action, or can generate a probability distribution over states of interest based on a consideration of data and events, for example. For example, inference component 216 can infer a user or client context and tailor query results based on user/client context.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Definition component 218 is configured to employ conclusions and determinations made by analysis component to generate definitions for global terms. For example, in an aspect, the definition of a global term can be pre-configured by data description and delivery service 101 or 102. In another aspect, the definition of a global term can be provided in association with an annotation or annotation file. For example, the annotator, client or user can not only annotate data with global terms but also provide definitions of those global terms. In another aspect as noted infra, analysis component can infer the definition of a global term based on its association with the underlying data and patterns of use of the global terms. In addition, analysis component can infer requirements of consumption of annotated data that can also be included in a definition of a global term. Definition component 218 therefore extracts possible definitions of global terms from conclusions made by analysis component 214 and creates definitions of global terms in data store 204 or adds to existing definitions of global terms in data store 204.

Filter component 220, is configured to apply the aspects of definitions of global terms relating to requirements for consumption of annotated data in association with interface component 208 to render search queries against data store 204 that are tailored to a client. In particular, filter component is configured to filter query results based on client consumption requirements. For example, in an aspect filter component 220 can determine appropriate layouts for presentation of data on different client devices or client applications, and determine location specific applications of vocabularies. For example, depending on user device capabilities, certain display visualizations of data may not be supported although represented by an annotation. In another aspect, certain perspectives on data might be inappropriate in for use in certain contexts or environments. According to this aspect, analysis component 214 and/or inference component can use tracked data indicating location and/or context of consumption of data according to a perspective to determine restrictions for applications of data models and or global terms and associate those restrictions with the definitions of respective global terms. In another aspect, a client can implicitly or explicitly provide data description and delivery service 202 with its consumption requirements. For example, a client may indicate the type of program that which in turn can reflect to the service 202 its consumption requirements. In another example, the client may provide consumption requirements in the form of key terms a part of a query request. Interface component 208 can further employ the conclusions regarding restrictions for consumption when issuing query results to a client. For example, a query result can red flag data sources and data models which may not be appropriate for a client or simply not offer those data sources and perspectives on data to the client.

Figure 3:
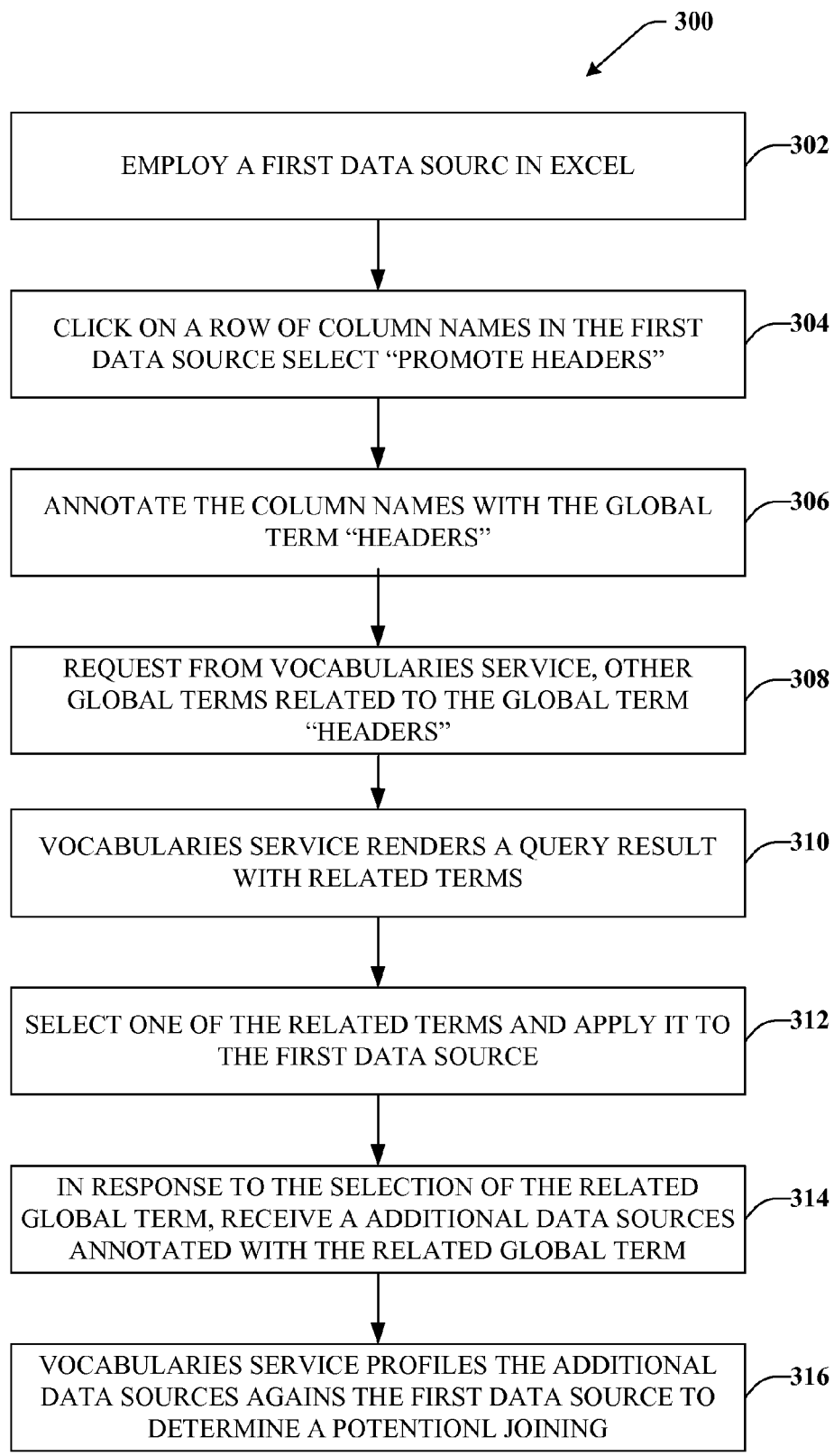
FIG. 3 illustrates a flow diagram of an example implementation of a data description and delivery service in accordance with an embodiment.

Moving now to FIG. 3, illustrated is a flow diagram 300 exemplifying an application of data description and delivery service 102 or data description and delivery service 202. At 302, a user works with an original data source via a client application such as Excel. The original data source includes merely a comma separated list of objects. The user further desires to publish the data source as an Odata feed. At 304, the user clicks on row in the data source where column names are located, and selects an action called "promote headers" which indicates the column names should be employed as the column names for the Odata feed. As a result, at 306 the client application can automatically annotate the column names with a global term "headers." At 308, the client application can further request from data description and delivery service, other global terms which are related to the global term "headers." At 310, the data description and delivery service 102 or 202 can render a query result with related global terms. For example, a query result could include global terms such as "company name," "contact name," or "address." At 312, the user can select a proposed global term and apply it to his data source. For example, the user can select the term "company name" to name a column. Then at 314, following selection and application of the suggested term "company name," the data description and delivery service can further inform the user of additional data sources that are annotated with the selected global term, "company name." Then at 316, the data description and delivery service can profile the additional data sources and the user's data source to determine if there is significant overlap in data content to see determine if a possible join between any of the sources would afford the user additional value.

Figure 4:
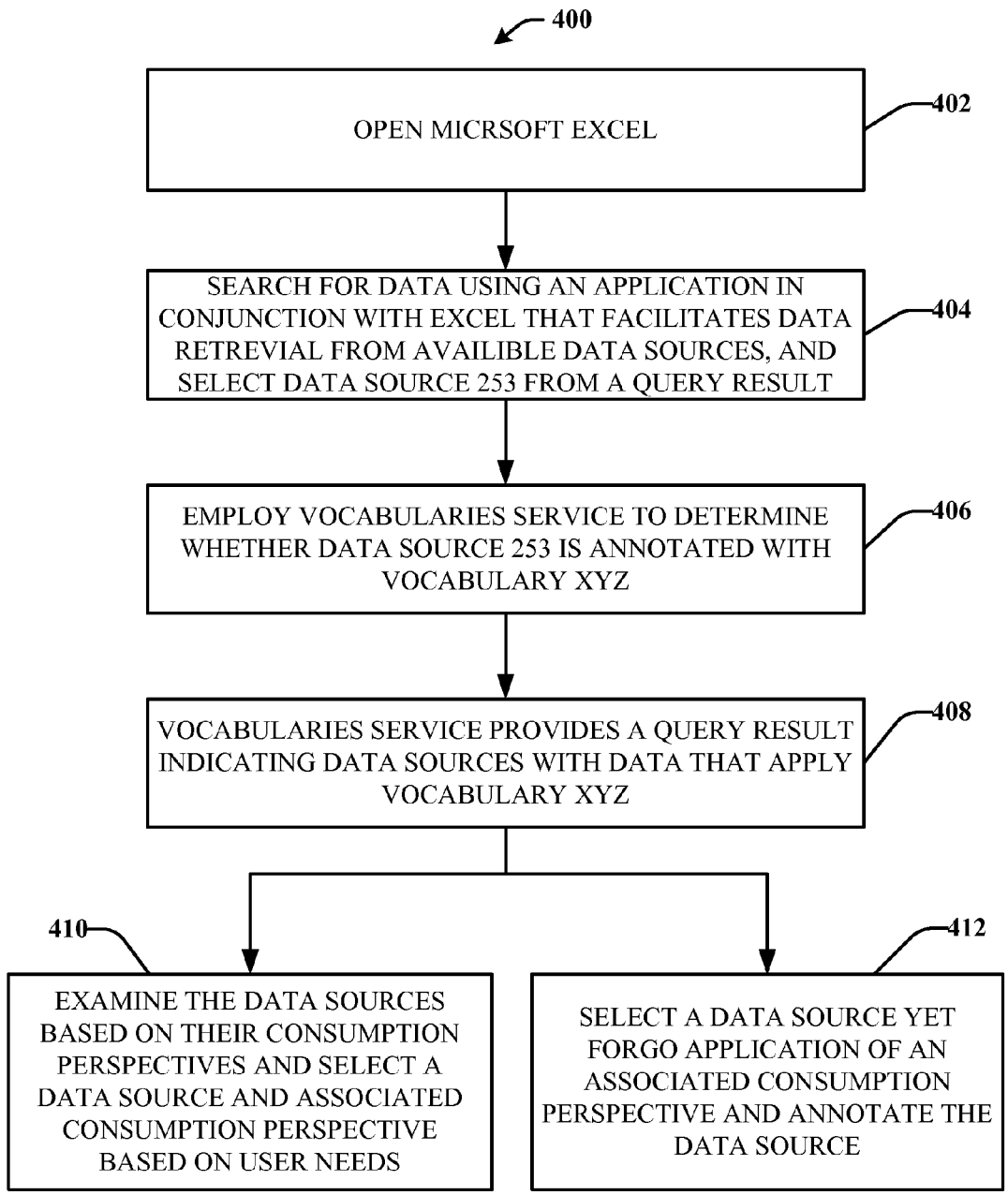
FIG. 4 illustrates a flow diagram of another example implementation of a data description and delivery service in accordance with an embodiment.

Looking at FIG. 4, illustrated is a flow diagram 400 exemplifying another application of data description and delivery service 102 or data description and delivery service 202. According to the example application of data description and delivery service 102 or 202 in FIG. 4, a set of global names ABC (i.e. a vocabulary) exists and are defined in the data description and delivery service that are employed to aid in the visualization of data. For example, one of the global terms can indicate what is a "title" so a client application knows what to put in bold, or another one of the global terms can indicate what is a "summary" so the client application knows where and how to display the summary. In addition, in the service there are annotations of the global terms included in the set.

With the above foundation, at 402, a user can employ a client application, for example, Excel. At 404, the user can further employ an application associated with Excel that enables data browsing. In an aspect, the user can select a data source, say data source 253, that is formatted as an Odata feed. At 406, the user can ask the data description and delivery service whether data source 253 has been annotated, in particular, the user can ask the data description and delivery service whether the ABC vocabulary has been applied to data source 253. At 408, the data description and delivery service 102 or 202 can answer the user by providing a query result with links to various perspectives on data for data source X that have been modeled in different ways with the ABC vocabulary. At 410, the user can sample view the various data models and select one for consumption. In another aspect, at 412, the user can select a data source and decide not to employ the perspective on the data associated therewith, and in the alternative annotate the data himself thus creating a new perspective on the data which he can then publish to the data description and delivery service.

FIGS. 5-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers.

Figure 5:
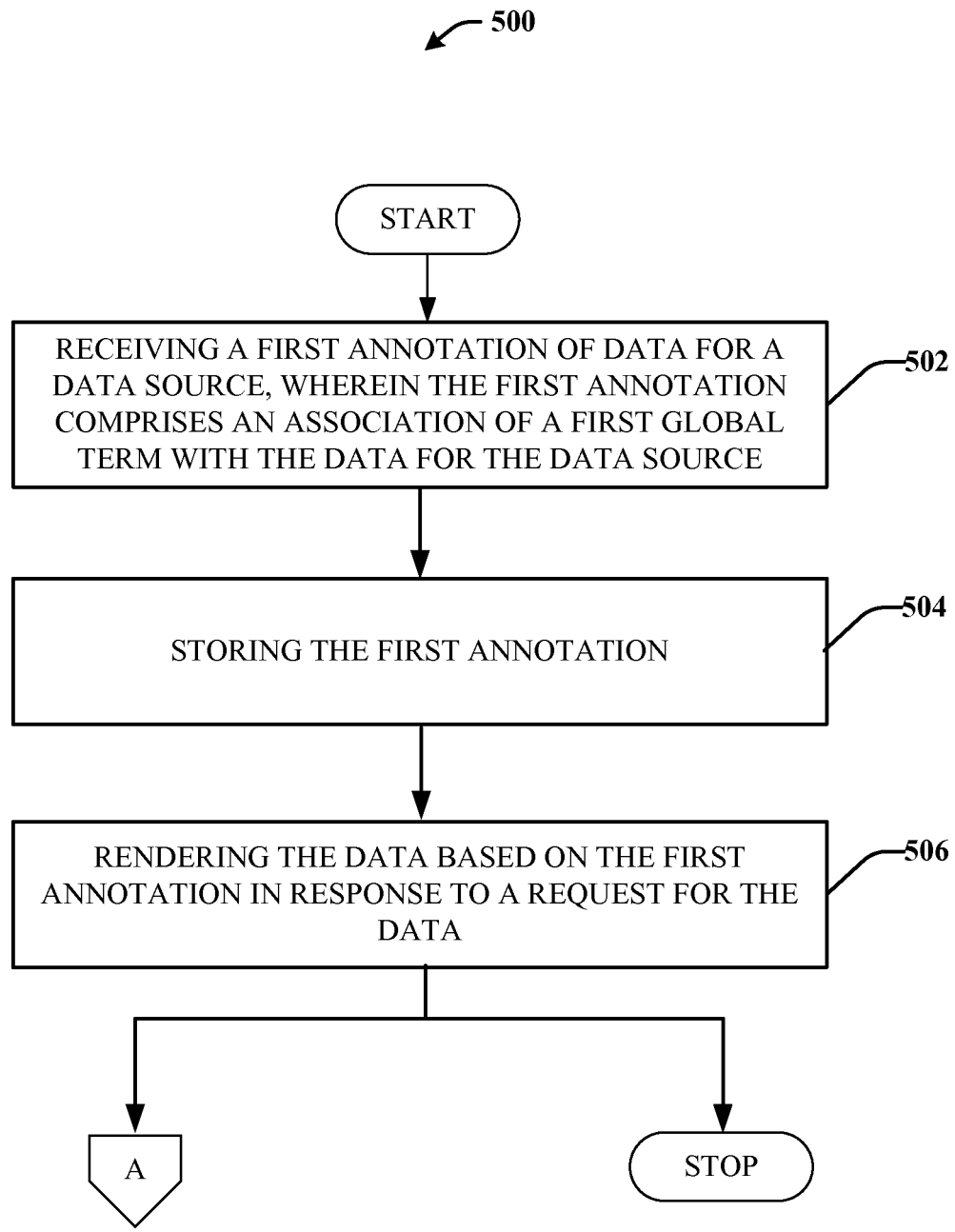
FIG. 5 illustrates a process for storing an annotation of a data source and rendering the annotation upon a request for data from the data source.

Referring now to FIG. 5, exemplary method 500 for storing an annotation of a data source and rendering the annotation upon a request for data from the data source is depicted. Generally, at reference numeral 502, a first annotation of data is received for a data source, wherein the first annotation comprises an association of a first global term with the data for the data source. At reference numeral 504, the first annotation is stored. At reference numeral 506, the data is rendered based on the first annotation in response to a request for the data. At this time the method can stop or continue with point A as described with reference to FIG. 6.

Figure 6:
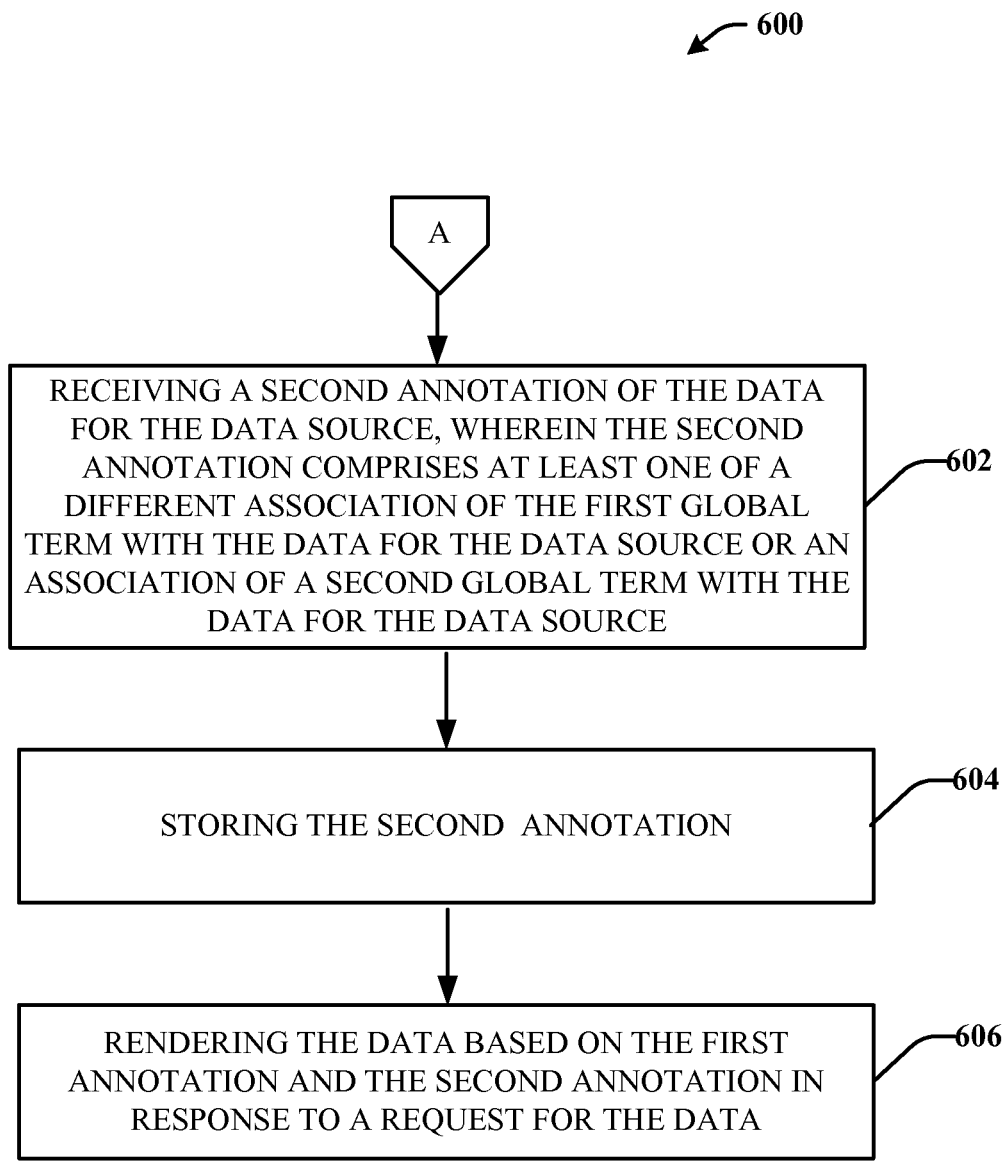
FIG. 6 illustrates a process of community enrichment of data.

Turning now to FIG. 6, depicted is an exemplary method 600 for providing additional features or aspects in connection with storing annotations of a data source and rendering the annotation upon a request for data from the data source. In particular, method 600 depicts the ability to the subject data description and delivery service to collect multiple annotations of a data for a single data source, thus enabling community enrichment of data. FIG. 6 picks up the method of FIG. 5 from point A. Generally at reference numeral 602, a second annotation of the data for the data source is received, wherein the second annotation comprises at least one of a different association of the first global term with the data for the data source or an association of a second global term with the data for the data source. At reference numeral 604, the second annotation is stored. Then, at reference numeral 60, the data is rendered based on the first or second annotation in response to a request for the data.

Figure 7:
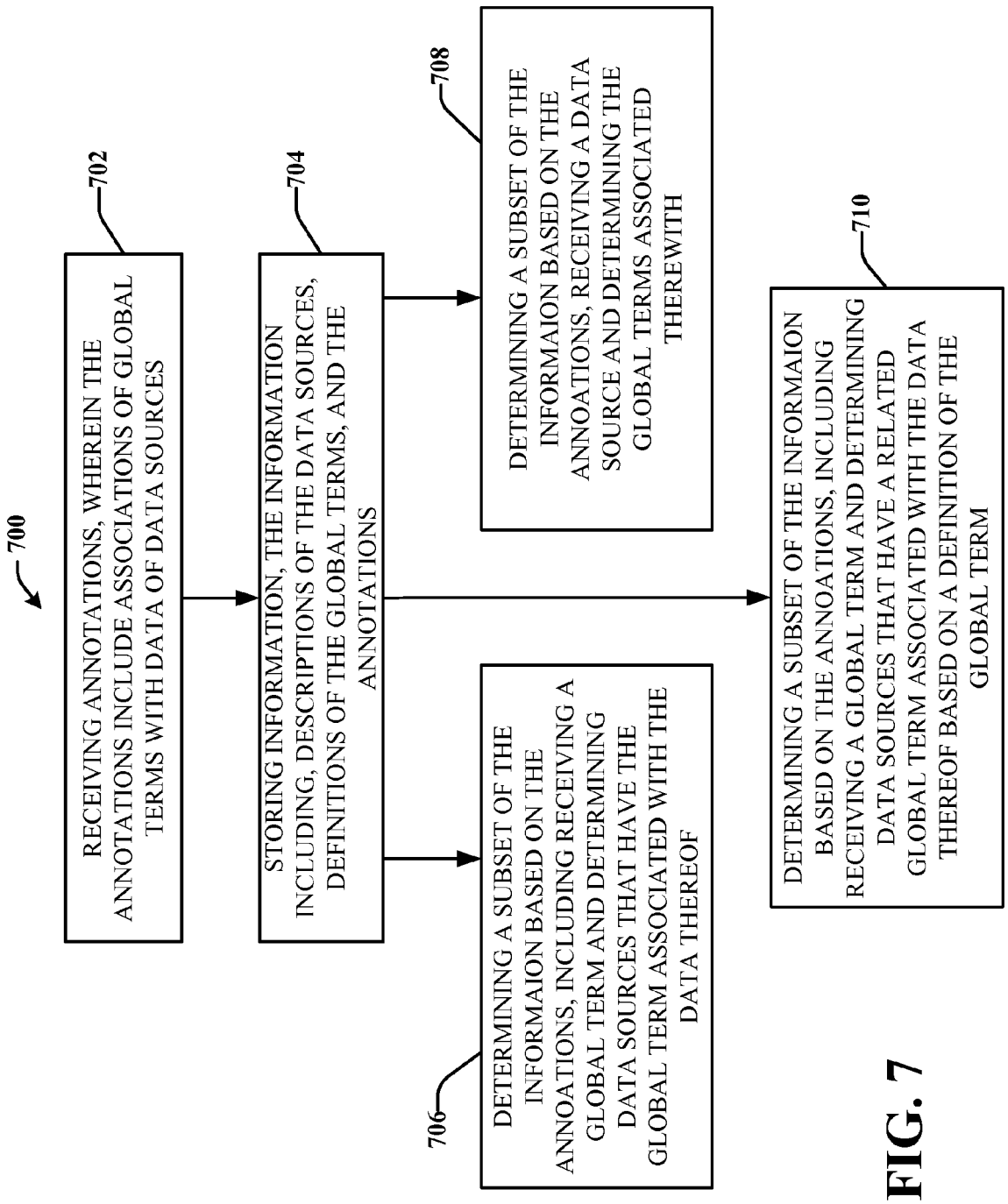
FIG. 7 illustrates a process for issuing queries against a data description and delivery service in accordance with various embodiments.

With reference now to FIG. 7, exemplary method 700 for issuing queries against data description and delivery service is presented. In general, at reference numeral 702, annotations are received, wherein the annotations include associations of global terms with data of data sources. Then at 704, information is stored, the information including descriptions of the data sources, definitions of the global terms, and the annotations. Then a subset of the information is determined based on the annotations. For example, at 706, the subset of information is determined by receiving a global term and determining data sources that have the global term associated with the data thereof. In another aspect, at 708, the subset of information is determined by receiving a data source and determining the global terms associated therewith. Further at 710, the subset of information is determined by receiving a global term and determining data sources that have a related global term associated with the data thereof based on a definition of the global term.

Figure 8:
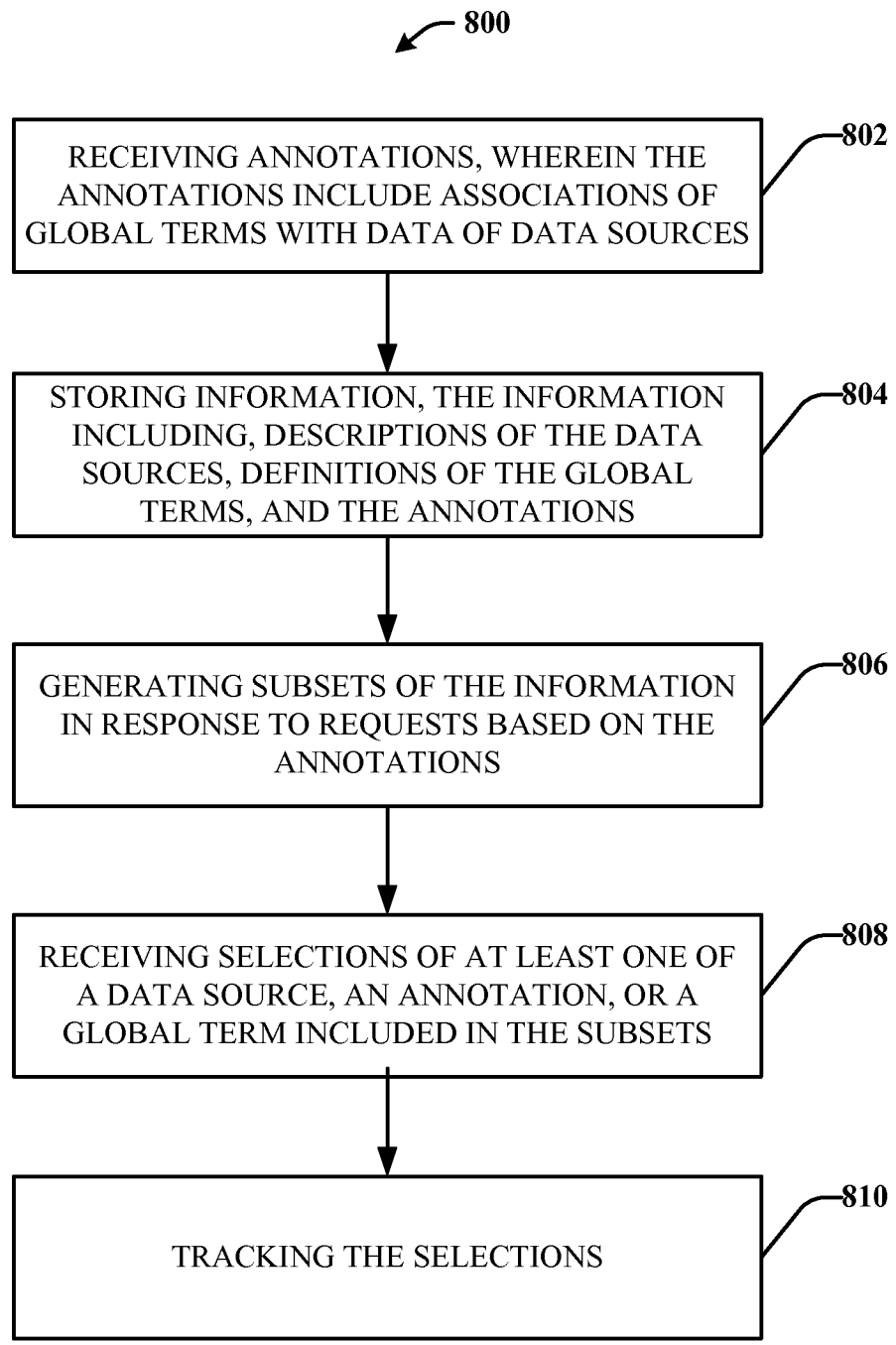
FIG. 8 illustrates a process of tracking use of a data description and delivery service for business intelligence analysis.

Referring now to FIG. 8, presented is a process of tracking use of a data description and delivery service for business intelligence analysis. Generally, at reference numeral 802, annotations are received, wherein the annotations include associations of global terms with data of data sources. At reference numeral 804, information is stored, the information including descriptions of the data sources, definitions of the global terms, and the annotations. At reference numeral 806, subsets of the information are generated in response to requests based on the annotations. For, example, a user can issue queries against the data store to find appropriate global terms or to find data sources that include particular global terms or vocabularies. The user may use global terms as key words in query searches or definitions of global terms. At reference numeral 808, a selection of at least one of a data source, an annotation, or a global terms included in the subsets is received. Then at 810, the selection is tracked. For example, data description and delivery service via tracking component 210, can track queries requests and selections so that relationships between global terms and data sources can be learned.

Exemplary Networked and Distributed Environments

One of ordinary skill in the art can appreciate that the various embodiments of dynamic composition described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the smooth streaming mechanisms as described for various embodiments of the subject disclosure.

Figure 9:
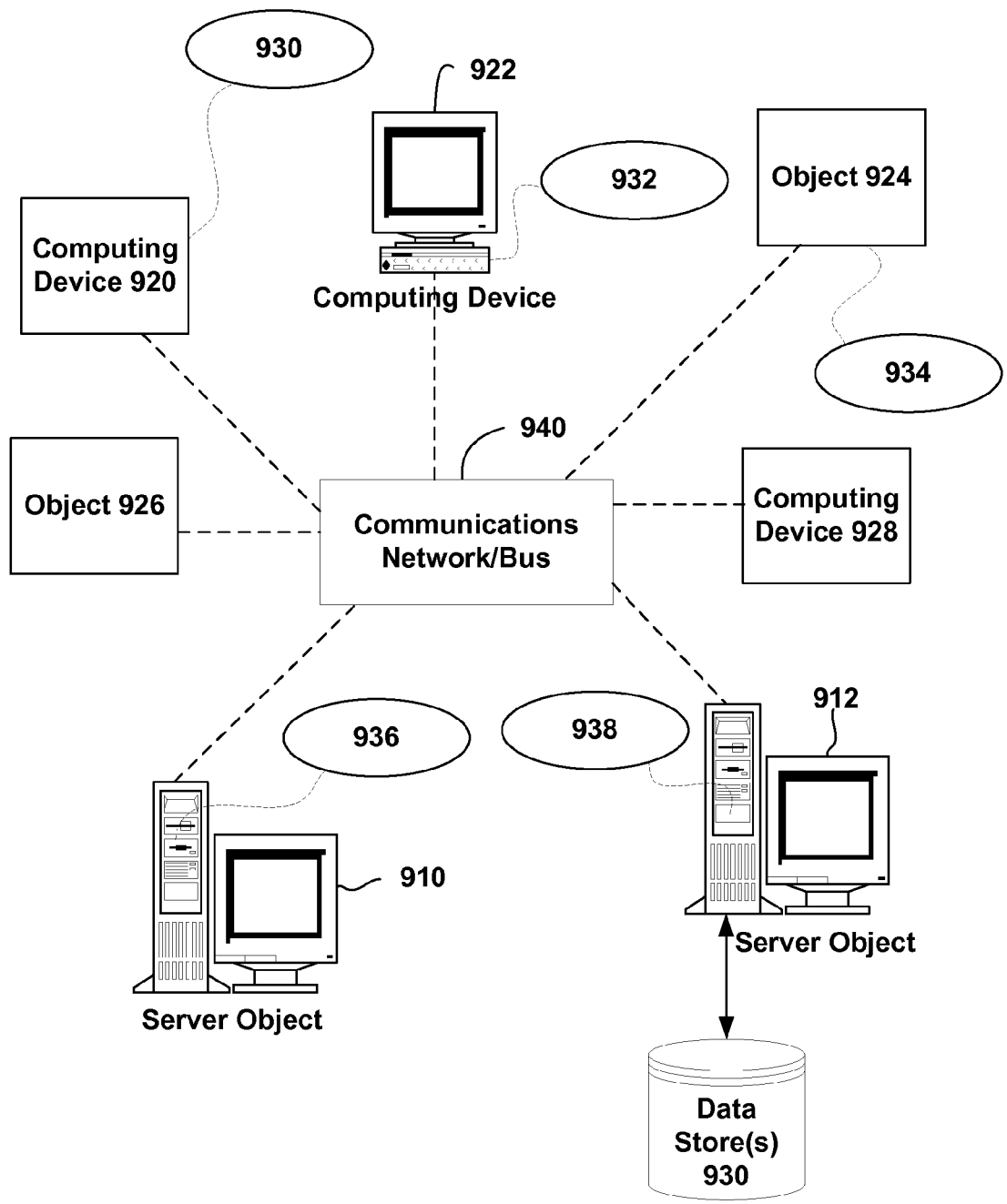
FIG. 9 is a block diagram representing an exemplary non-limiting networked environment in which the various embodiments may be implemented.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 910, 912, etc. and computing objects or devices 920, 922, 924, 926, 928, etc. may comprise different devices, such as PDAs, audio/video devices, mobile phones, MP3 players, personal computers, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation of the smooth streaming provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the dynamic composition systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 910, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances. Any of these computing devices may be processing data, or requesting transaction services or tasks that may implicate the techniques for dynamic composition systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for performing read set validation or phantom checking can be provided standalone, or distributed across multiple computing devices or objects.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Servers 910, 912, etc. may also serve as client computing objects or devices 920, 922, 924, 926, 928, etc., as may be characteristic of a distributed computing environment.

Exemplary Computing Device

Figure 10:
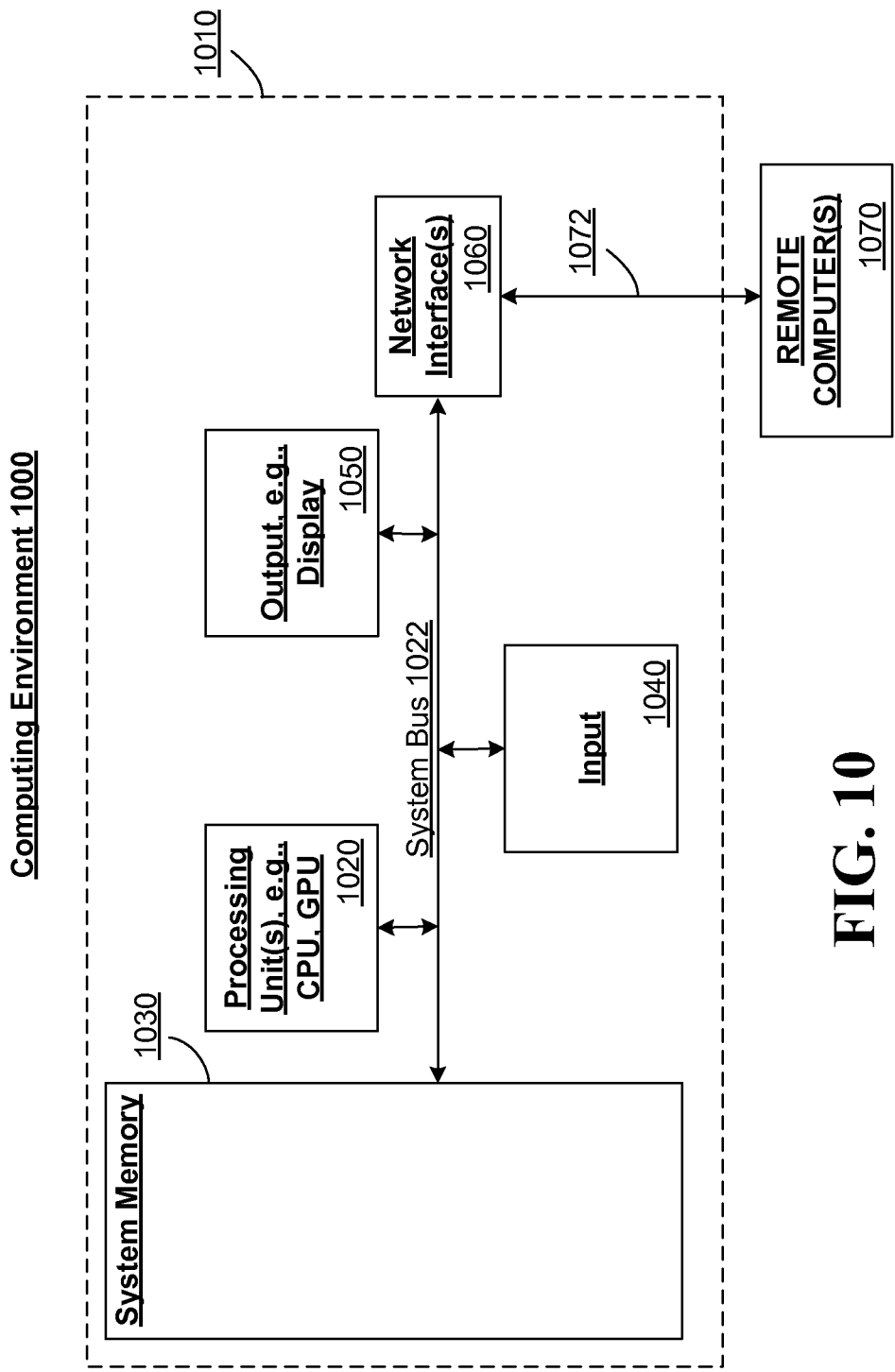
FIG. 10 is a block diagram representing an exemplary non-limiting computing system or operating environment in which the various embodiments may be implemented.

As mentioned, advantageously, the techniques described herein can be applied to any device where it is desirable to perform dynamic composition. It is to be understood, therefore, that handheld, portable and other computing devices and computing objects of all kinds are contemplated for use in connection with the various embodiments, i.e., anywhere that a device may wish to read or write transactions from or to a data store. Accordingly, the below general purpose remote computer described below in FIG. 10 is but one example of a computing device. Additionally, a database server can include one or more aspects of the below general purpose computer, such as a media server or consuming device for the dynamic composition techniques, or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the dynamic composition techniques. Thus, embodiments herein are contemplated from the standpoint of an API (or other software object), as well as from a software or hardware object that implements one or more aspects of the smooth streaming described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A computer-implemented system, comprising:
   an annotation component configured to receive, from a client device via a network, a first annotation of a data source, wherein the first annotation comprises an association of a first global term with data for the data source;
   a data store configured to store the first annotation;
   an interface component configured to render the data based on the first annotation in response to a request for the data and further configured to receive a client query to be run against the data store, the client query requesting an identification of data sources to which a respective vocabulary has been applied; and
   an analysis component configured to determine, based on information stored in the data store, and in response to the client query, whether the respective vocabulary has been applied to the data source to annotate the data source in accordance with a set of global terms of the respective vocabulary.

2. The computer-implemented system of claim 1, wherein the annotation component is further configured to receive a second annotation of the data for the data source, wherein the second annotation comprises at least one of a different association of the first global term with the data for the data source or an association of a second global term with the data for the data source, the data store is further configured to store the second annotation and the interface component is further configured to render the data based on the first and second annotations in response to another request for the data.

3. The computer-implemented system of claim 1, wherein the first global term conveys a property of the data or the data source.

4. The computer-implemented system of claim 1, wherein the first global term conveys a manner of use of the data by a client.

5. The computer-implemented system of claim 1, wherein the first global term conveys a manner in which to present the data by a client.

6. The computer-implemented system of claim 1, wherein the first global term conveys a meaning about the data, wherein the meaning is recognized by at least two different clients.

7. The computer-implemented system of claim 1, wherein the computer implemented system is accessed by a client over a public network, including the world wide web.

8. The computer-implemented system of claim 1, wherein the computer implemented system is accessed by a client over a private network.

9. A computer-implemented data description and data delivery method, comprising:
   receiving, at a server computer via a network, an annotation of a data source, wherein the annotation comprises an association of a first global term with data for the data source;
   storing information on a data store, the information including descriptions of the data source, definitions of the first global term, and the annotation;
   receiving a client query to be run against the data store, the client query requesting an identification of data sources to which a respective vocabulary has been applied;
   determining, by the server computer, based on information stored in the data store, and in response to the client query, whether the respective vocabulary has been applied to the data source to annotate the data source in accordance with a set of global terms of the respective vocabulary; and
   providing, by the server computer, a second global term used for data source annotation in response to a query from a client device for global terms related to the first global term.

10. The method of claim 9, wherein the determining the subset of information includes receiving a third global term and determining data sources that have the third global term associated with the data thereof.

11. The method of claim 9, wherein the determining the subset of information includes receiving a data source and determining a set of global terms associated therewith.

12. The method of claim 9, wherein the determining the subset of information includes determining data sources that have the first global term associated with the data thereof based on a definition of the first global term.

13. The method of claim 9, wherein the first global term conveys properties of the data for respective data source.

14. The method of claim 9, wherein the global first global term conveys manners of use of the data respective data sources by a client.

15. The method of claim 9, wherein the global first global term conveys manners in which to present the data of the respective data source by a client.

16. The system of claim 9, wherein the first global term conveys meanings about the data for the respective data source, wherein the meanings are recognized by at least two different clients.

17. A computer readable storage medium comprising computer executable instructions that, in response to execution, cause a computing system to perform operations, comprising:

receiving annotations of data sources, wherein the annotations include associations of global terms with data for the data sources;

storing information, the information including descriptions of the data sources, definitions of the global terms, and the annotations;

receiving a client query, the client query requesting an identification of data sources to which a respective vocabulary has been applied;

determining, based on the information, and in response to the client query, whether the respective vocabulary has been applied to a respective one of the data sources to annotate the respective data source in accordance with a set of global terms of the respective vocabulary;

generating subsets of the information in response to requests based on the annotations;

receiving selections of at least one of a data source, an annotation, or a global term included in the subsets; and tracking the selections.

18. The computer readable storage medium of claim 17, the operations further comprising:

determining a relationship between respective requests and respective selections; and determining the subsets of the information based on the relationship.

19. The computer readable storage medium of claim 17, the operations further comprising:

determining preferences for at least one of the data sources, the annotations, or the global terms in response to the tracking.

20. The computer readable storage medium of claim 17, wherein the tracking the selections includes tracking the types of clients affiliated with the selections.

21. The computer readable storage medium of claim 17, the operations further comprising:

receiving ratings of at least one of the data sources or the annotations; and employing the ratings to determine at least one of: a popularity of respective data sources, a popularity of respective annotations, a quality of respective data sources, or a quality of respective annotations.

* * * * *